(12) United States Patent
Matsuhira

(10) Patent No.: US 6,898,332 B2
(45) Date of Patent: May 24, 2005

(54) IMAGE PROCESSING DEVICE AND IMAGE PROCESSING METHOD

(75) Inventor: Masatoshi Matsuhira, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 553 days.

(21) Appl. No.: 09/987,440

(22) Filed: Nov. 14, 2001

(65) Prior Publication Data

US 2002/0067864 A1 Jun. 6, 2002

(30) Foreign Application Priority Data

| Nov. 15, 2000 | (JP) | .................................. 2000-347605 |
| Nov. 22, 2000 | (JP) | .................................. 2000-356707 |
| Dec. 14, 2000 | (JP) | .................................. 2000-380490 |
| Dec. 27, 2000 | (JP) | .................................. 2000-398418 |

(51) Int. Cl.$^7$ .............................................. G06K 9/36
(52) U.S. Cl. ................... 382/284; 382/282; 382/294; 382/300; 358/538; 358/540; 358/450; 358/453
(58) Field of Search ............................... 382/219, 282, 382/284, 287, 291, 294, 300; 358/3.26, 3.27, 5.25, 538, 540, 450, 453

(56) References Cited

U.S. PATENT DOCUMENTS 5,465,163 A * 11/1995 Yoshihara et al. .......... 358/444
6,075,905 A *  6/2000 Herman et al. ............. 382/284
6,545,685 B1 *  4/2003 Dorbie ....................... 345/582
6,707,464 B2 *  3/2004 Ham et al. .................. 345/629
6,714,680 B1 *  3/2004 Sasada ....................... 382/216

FOREIGN PATENT DOCUMENTS

| JP | 08-315129   | 11/1996 |
| JP | 09-018877   |  1/1997 |
| JP | 11-252356   |  9/1999 |
| JP | 2000-312294 | 11/2000 |

OTHER PUBLICATIONS

Office Action from Japanese Patent Office for Application No. 2000–398418 dated Jun. 4, 2004.

* cited by examiner

Primary Examiner—Bhavesh M. Mehta
Assistant Examiner—Yosef Kassa
(74) Attorney, Agent, or Firm—Westerman, Hattori, Daniels & Adrian, LLP

(57) ABSTRACT

The object of the invention is to convert a low-quality original image into a high-quality fractal-interpolated image. From a low-quality original image, original image blocks of n×n size, which are mutually overlapping and each centered on each pixel of the original image, are acquired. Also, similar image blocks of 2n×2n size, which are each similar to each of the original image blocks, are detected from the original image by affine transformation. The detected similar image blocks are reduced to the same size as the original image blocks, and then substituted for the original image blocks respectively. Then, overlapping portions of the substituted similar image blocks are adjusted by averaging. As a result, a high-quality fractal-interpolated image is generated.

32 Claims, 22 Drawing Sheets

FIG.9
| Px1 | Px2 | Px3 |
|-----|-----|-----|
| Px4 | Px5 | Px6 |
| Px7 | Px8 | Px9 |
(A) LEVEL DIFFERENCE OF ROWS ABOVE AND BELOW CURRENT PIXEL
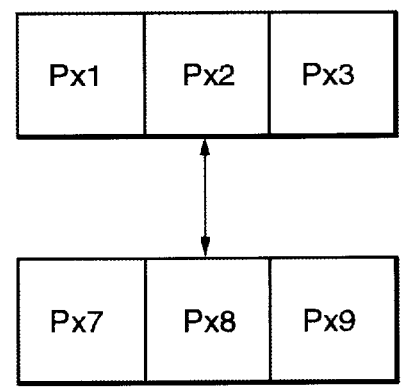
(B) LEVEL DIFFERENCE OF ROWS TO LEFT AND RIGHT OF CURRENT PIXEL
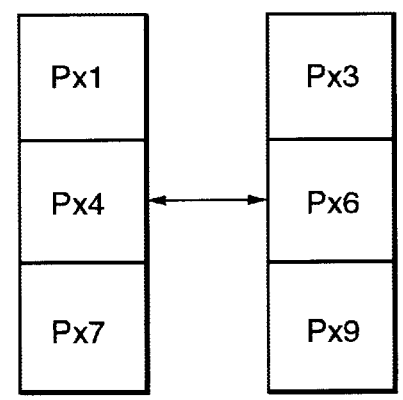

FIG.14
(A) EDGE STRENGTH≦TH1
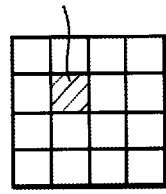
CURRENT PIXEL
LOCAL REGION IMAGE
(B) TH1＜EDGE STRENGTH≦TH2
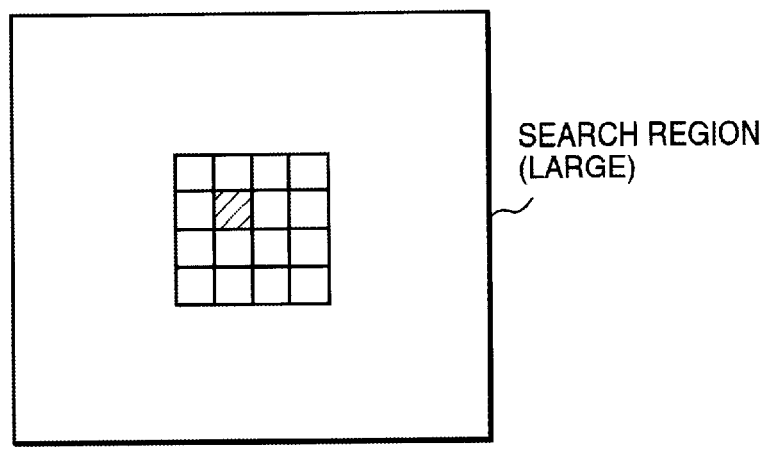
SEARCH REGION (LARGE)
(C) TH2 ＜EDGE STRENGTH≦TH3
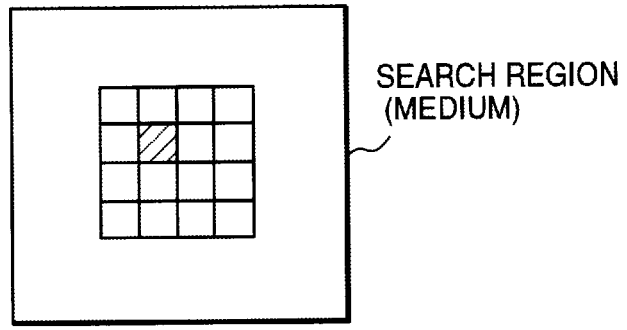
SEARCH REGION (MEDIUM)
(B) TH3＜EDGE STRENGTH
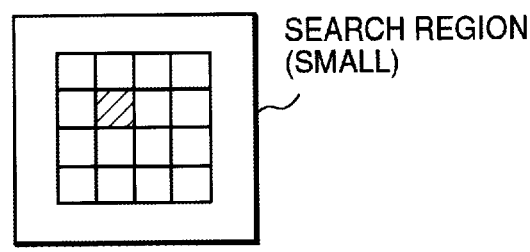
SEARCH REGION (SMALL)

FIG.18
(A) EDGE STRENGTH ≦ TH1
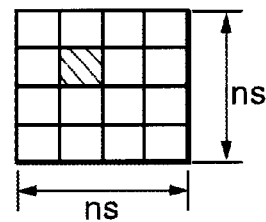
(B) TH1 < EDGE STRENGTH ≦ TH2
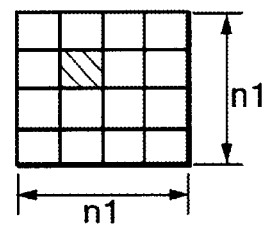
(C) TH2 < EDGE STRENGTH ≦ TH3
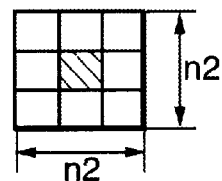
(B) TH3 < EDGE STRENGTH
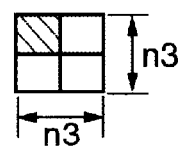

FIG.21
(A) EDGE STRENGTH ≦ TH1
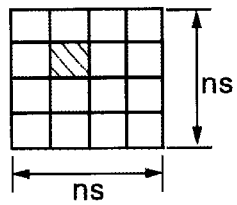
(B) TH1 < EDGE STRENGTH ≦ TH2
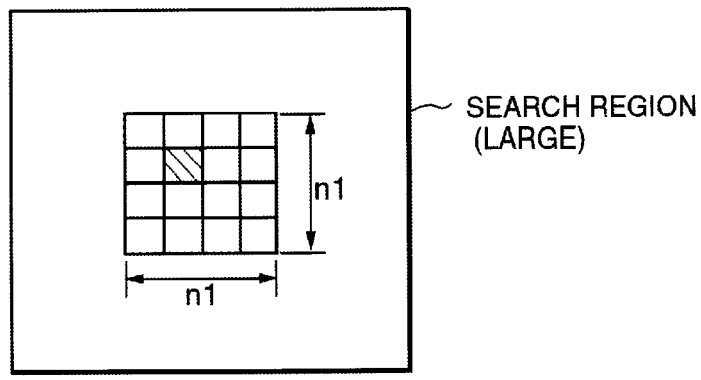
SEARCH REGION (LARGE)
(C) TH2 < EDGE STRENGTH ≦ TH3
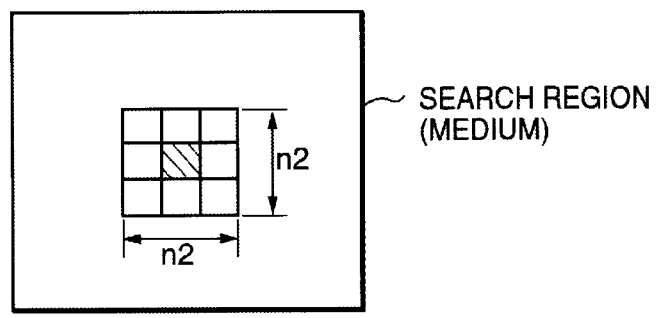
SEARCH REGION (MEDIUM)
(B) TH3 < EDGE STRENGTH
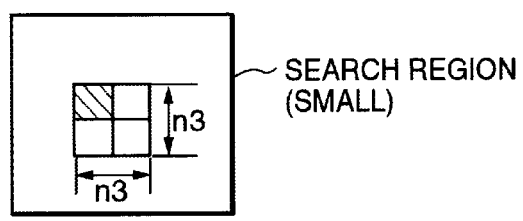
SEARCH REGION (SMALL)

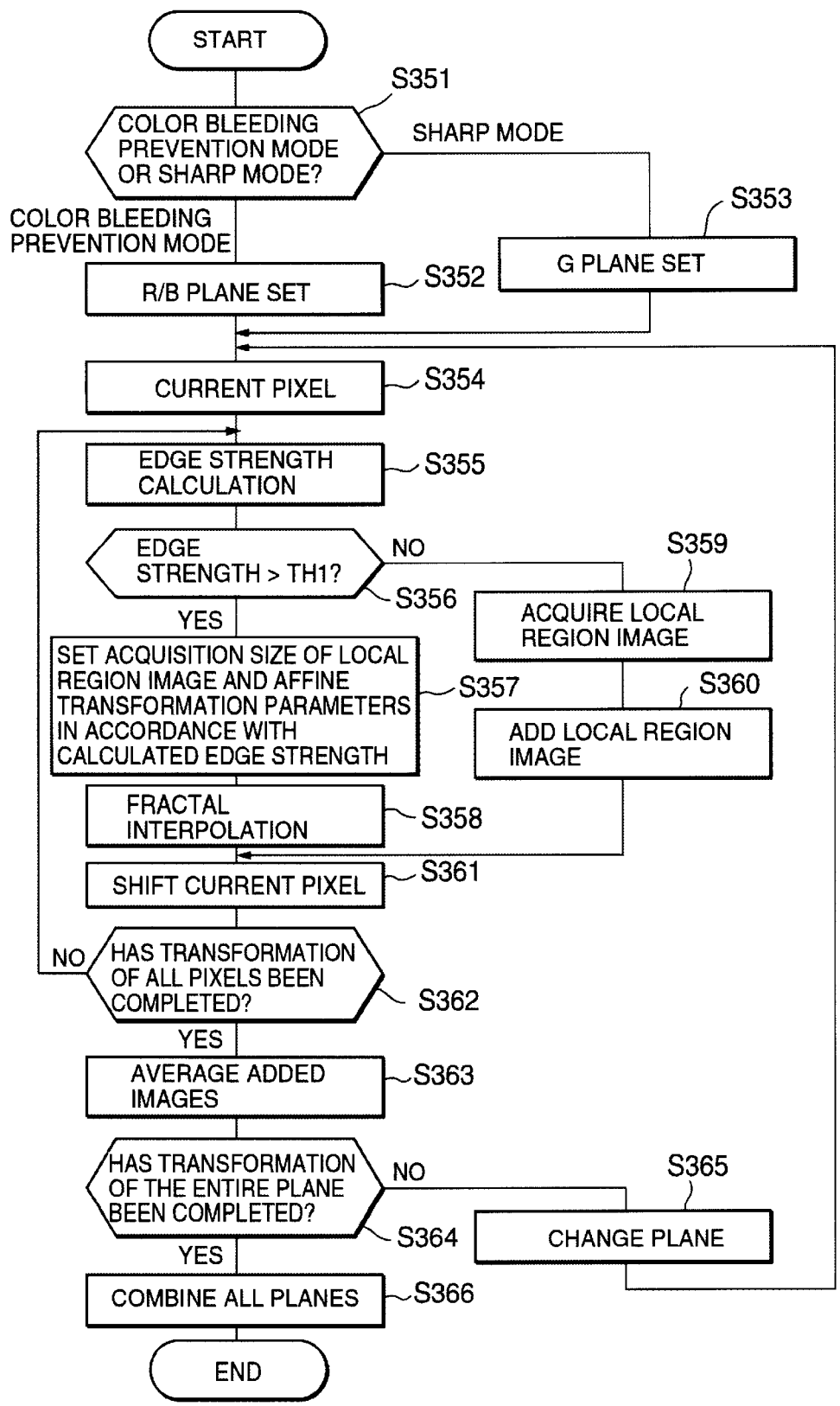

IMAGE PROCESSING DEVICE AND IMAGE PROCESSING METHOD

BACKGROUND OF THE INVENTION

1. Field of the Invention

The present invention relates to an image processing device and image processing method capable of converting for example a low-quality image into a high-quality image by interpolation.

2. Description of the Related Art

For example when converting a low-quality digital image to a high-quality digital image, converting a low resolution image to high resolution, or enlarging an image, image interpolation is performed by for example inserting new pixels between one original pixel and another. Known methods of digital image interpolation include for example the nearest-neighbor interpolation method (also called the zero-order holding method), linear interpolation method (also called the straight-line interpolation method, collinear interpolation method, or bilinear method), cubic convolution interpolation method (also called the bi-cubic method).

Since the basic concept of the methods of interpolation described above is interpolation using a sinc function based on the theory of sampling, they are theoretically correct only when the original image consists of frequency components of no more than half the Nyquist frequency. However, since the frequency components contained in an actual original image are infinitely large, it is not possible to restore high frequency components contained in the original image by the aforesaid interpolation methods.

The frequency conversion method has therefore been proposed as a technique for interpolating high frequency components lost in such sampling processes. A well-known example of the frequency conversion method is the Gerchberg-Papoulis iteration method (GP method), in which an operation wherein band-limited frequency components in a frequency range are projected in real space and only a restricted range of the total real space components is projected in frequency space, a band-limited portion of the total frequency components being again projected in real space after substitution with the original frequency components, which are known, is repeated infinitely many times. Usually, the computational load is reduced by employing the DCT algorithm for frequency conversion (IM-GPDCT method).

However, processing time is lengthened by the fact that it is necessary to repeat the DCT algorithm or inverse DCT algorithm until suitable high-frequency components are obtained. Also, there is a risk that picture quality will be lowered by emphasizing noise or generation of ringing.

SUMMARY OF THE INVENTION

In view of the foregoing, an object of the present invention is to provide an image processing device and image processing method whereby higher-quality images can be obtained more rapidly.

In order to achieve the above object, according to a first aspect of the present invention, image blocks overlapping with adjacent image blocks are acquired from the original image, and then are respectively substituted by other images similar to themselves which detected from the original image.

Specifically, according to a first aspect of the present invention, there is provided an image processing device comprising: original image inputting means for inputting an original image; image block acquisition means that acquires original image blocks of prescribed size from the original image, adjacent ones of the original image blocks being arranged to overlap with each other; similar image detection means that detects, from the original image, similar image blocks that are each similar to each of the original image blocks; image substitution means that substitutes each of the similar image blocks for each of the original image blocks; and image adjustment means that adjusts the overlapping portions of the similar image blocks substituted for the original image blocks.

The similar image detection means may detect similar image blocks of a size greater than the size of the aforesaid original image blocks and compress the size of these similar image blocks so as to be equal to the size of the original image blocks.

For example, if the size of the original image block is n×m and the size of the similar image blocks is (k×n)×(k×m), the sizes of the original image block and the similar image blocks may be made to coincide by reducing the sizes of the similar image blocks by a factor of 1/k.

Alternatively, the similar image detection means made detect similar image blocks of the same size as the original image blocks by acquiring scattered pixels from prescribed regions which are set up in the original image with a size larger than the size of the original image blocks.

In terms of the example described above, similar image blocks of the same size as the original image blocks having n×m pixels can be obtained by extracting $1/k^2$ pixels from the similar image blocks having (k×n)×(k×m) pixels and discarding the remaining pixels.

The similar image detection means may respectively detect similar image blocks similar to the original image blocks from the original image under a prescribed condition that is set beforehand.

The prescribed condition may be a condition for setting search regions in which similar image blocks are searched. And the similar image detection means may be arranged to detect each similar image block within each search region that is set smaller than the original image.

Although similar image blocks may be searched for throughout the entire original image, the time required for detection of the similar image blocks increases as the search region is made larger. Processing time can be shortened by setting the search region smaller than the original image. Further, each search region may be set at the periphery of each original image block. By this, the processing time for detection of a similar image block can be shortened, if there is a high probability that a similar image block will be present at the periphery of each original image block, although this depends on the characteristics of the original image (whether it is a natural image or a text image etc) and on the size etc of the image block.

The prescribed condition may be a condition for setting search regions in which similar image blocks are searched and a image manipulation parameter for detecting the similar image blocks. The similar image detection means may then be constructed such as to acquire a plurality of candidate similar image blocks, while varying the parameters condition of image manipulation, from the search region which is set with respect to each original image block, and then select, as a similar image block, one of the candidate image blocks that is most similar to the each of the original image blocks.

Examples that may be given of "image manipulation" include affine transformations such as performing parallel displacement, enlargement, reduction, or rotation of the image. Examples that may be given of "image manipulation parameter" may be the amount of parallel displacement, the enlargement factor, the reduction factor, the angle of rotation, or a set of those parameters. The similar image detection means acquires a plurality of candidate image blocks whilst varying the image manipulation parameter within a prescribed search region and then detects as a similar image block the one that is most similar to the original image block from those plural candidate image blocks.

The similar image detection means may determines the best image manipulation parameter by evaluating the similarity of the candidate image blocks while varying the image manipulation parameter, and detects the similar image block using the best image manipulation parameter.

If all of the candidate image blocks were to be respectively held, the memory region required for storing all the candidate image blocks would be large, but, by holding only the best parameter necessary for obtaining a candidate image block with smallest distance from the original image block, the similar image block can be detected using only a small memory region.

If the original image is a color image, the prescribed conditions can be set individually for each component of the colorimetric system.

For example, in the case of an RGB colorimetric system, the place and extent of the search region and/or the type and image manipulation parameters can be set individually for each color component, namely, R (red), G (green), or B (blue). Not just in an RGB colorimetric system but also in a YUV colorimetric system, YIQ colorimetric system, YCbCr colorimetric system, or Lab colorimetric system etc, the prescribed conditions for detecting similar image blocks can be altered for each of the color components of each colorimetric system. It is thereby possible to alter the prescribed conditions for each color component, in accordance with for example the type of appliances (digital camera, printer, scanner etc) to which this image processing device is applied and/or the characteristics of the original image (natural image or not) and the preferences etc of the user.

According to a second aspect of the present invention, image blocks overlapping with adjacent image blocks are acquired from an original image, the fractal character of each image block is evaluated, and then only image blocks that are evaluated as substantially having the significant degree of the fractal character are substituted by similar images, which are similar to themselves, detected from the original image.

Specifically, an image processing device according to the second aspect of the present invention comprises: original image inputting means for inputting an original image; image block acquisition means that acquires original image blocks of prescribed size from the original image, adjacent ones of the original image blocks being arranged to overlap with each other; fractal character evaluation means that evaluates the degree of the fractal character of each of the original image blocks; similar image detection means that detects, from the original image, similar image blocks that are each similar to each of fractal original image blocks that are evaluated by the fractal character evaluating means as substantially having the significant degree of the fractal character; image substitution means that substitutes each of the similar image blocks for each of the fractal original image blocks; image addition means that integrates the similar image blocks substituted for the fractal original image blocks and non-fractal original image blocks that are evaluated by the fractal character evaluating means as not substantially having the significant degree of the fractal character, arranging adjacent ones of the similar image blocks and the non-fractal original image blocks to overlap with each other; and image adjustment means that adjusts the overlapping portions of the similar image blocks and the non-fractal original image blocks integrated by the image addition means.

The edge strength of each of the original image blocks may be employed to evaluate the fractal character of each of the original image blocks.

Similar image blocks similar to the original image block can be respectively detected from the original image utilizing the fractal character, in other words, the property that a pattern or shape of a given part of the image repeats in a larger or smaller size in the same image. It should be noted that detection of similar image blocks is not performed in respect of original image blocks whish evaluated as not having the significant degree of the fractal character.

The detected similar image blocks are substituted with respectively corresponding original image blocks. Original image blocks not having the significant degree of the fractal character (non-fractal original image blocks) are employed directly without substitution. Then, the substituted similar image blocks and non-fractal original image blocks are integrated in a manner that adjacent image blocks overlap with each other. In general terms, three types of overlapping are generated, namely, the first one between the similar image blocks, the second one between the similar image blocks and the non-fractal original image blocks, and the third one between the non-fractal original image blocks. The overlapping portions of those blocks then are adjusted.

According to a third aspect of the present invention, image blocks overlapping with adjacent blocks are acquired from an original image, search regions are set in accordance with the degree of the fractal character of the acquired image blocks, images similar to the acquired image blocks are detected from within the search regions, and the detected similar images are substituted for the acquired image blocks.

Specifically, an image processing device according to the third aspect of the present invention comprises: original image inputting means for inputting an original image; image block acquisition means that acquires original image blocks of prescribed size from the original image, adjacent ones of the original image blocks being arranged to overlap with each other; fractal character evaluation means that evaluates the degree of the fractal character of each of the original image blocks; similar image detection means that sets search regions for the original image blocks in accordance with evaluation results of the fractal character of the original image blocks, respectively, and then detects, from the search regions, similar image blocks that are each similar to each of the original image blocks; image substitution means that substitutes each of the similar image blocks for each of the original image blocks; image addition means that integrate the similar image blocks substituted for the original image blocks, arranging adjacent ones of the similar image blocks to overlap with each other; and image adjustment means that adjusts the overlapping portions of the similar image blocks integrated by the image addition means.

AS well as the edge strength of the original image block, the image similarity distance between the original image block and a larger image block covering the original image block (for example an image block 4 times as large as the original image block) may be employed to evaluate the degree of the fractal character.

The higher the degree of the fractal character becomes, The smaller the search region may be set. Preferably, at maximum, the search region is set to be smaller than the original image.

The likelihood of an image similar to the original image block being present at the periphery of this image block increases, as the degree of the fractal character of this image block increases. The processing time for detecting a similar image block can be shortened by variably setting the search region in accordance with the degree of the fractal character of each original image block.

It can be arranged for respective similar image blocks to be detected solely in respect of original image blocks which are evaluated as having the significant degree of the fractal character.

If the original image is a color image having plural color components of the colorimetric system, the processing according to the present invention may be applied solely to at least one color component that relates to the brightness of the color original image, or solely to the other color component or components.

Taking for example the case of an RGB colorimetric system, of the color component R (red), G (green) and B (blue), the G component contributes most to the brightness of the image, while the R component and B component contribute to the hue. Or taking for example the case of a YUV colorimetric system, YIQ colorimetric system, YCbCr colorimetric system and Lab colorimetric system, the Y component or the L component is the component that contributes most to the brightness of the image, while the other components (U, V, I, Q etc) contribute to the hue. Accordingly, it is made possible to select whether the present image processing is to be applied to the color component related to brightness or the other color components in accordance with the type of appliances to which the image processing device is applied (digital camera, printer, scanner etc) or characteristics of the original image (natural image or not), or the user's preferences etc.

According to a fourth aspect of the present invention, the size of each original image blocks to be acquired from an original image is set in accordance with the degree of the fractal character of each image in the vicinity of each prescribed pixel in the original image, then the original image blocks of the set sizes are acquired, then images similar to the acquired original image blocks are detected from the original image, and the detected similar images are substituted for the acquired original image blocks.

Specifically, an image processing device according to the fourth aspect of the present invention comprises: original image inputting means for inputting an original image; fractal character evaluation means that evaluates the degree of the fractal character of an image in the vicinity of each of prescribed pixels in the original image; block size setting means that sets a block size relating to each of the prescribed pixels in accordance with an evaluation result of the fractal character of the image in the vicinity of each of the prescribed pixels; image block acquisition means that acquires, from the original image, original image blocks each having the block size set by the block size setting means relating to each of the prescribed pixels, adjacent ones of the original image blocks being arranged to overlap with each other; similar image detection means that sets search regions of prescribed size for the original image blocks, respectively, and then detects, from the search regions, similar image blocks that are each similar to each of the original image blocks; image substitution means that substitutes each of the similar image blocks for each of the original image blocks; image addition means that integrate the similar image blocks substituted for the original image blocks, arranging adjacent ones of the similar image blocks to overlap with each other; and image adjustment means that adjusts the overlapping portions of the similar image blocks integrated by the image addition means.

The size of the original image block relating to each prescribed pixel is set in accordance with the degree of the fractal character of the image in the vicinity of this pixel. For example, the edge strength of an image of prescribed size ($x \times y$) approximately centered on the current pixel can be employed as an indicator relating to the degree of the fractal character of the image. The edge strength has the property of becoming stronger as the degree of fractal character increases. If the degree of fractal character is high, the size of the image block to be acquired can be made smaller. As the size of the acquired image block is made smaller, the processing time required for detecting a similar image block can be shortened.

The present invention can also be embodied in the form of a computer program. The program can be fixed on computer readable media of various types such as for example hard disks, floppy disks or memories. Also, there is no restriction to this, and for example a communication medium could be employed such as downloading the program from a server thorough a network to user computers.

BRIEF DESCRIPTION OF THE DRAWINGS

FIG. 9 is a diagram illustrating a method of calculating edge strength;

FIG. 14 is a diagram illustrating how the size of the search region is changed in accordance with the level of the edge strength;

FIG. 18 is a diagram illustrating how the block size of the local region image is changed in accordance with the level of edge strength;

FIG. 21 is a diagram illustrating how the local region image block size and the searching region size for affine transformation images are changed in accordance with edge strength; and FIG. 22 is a flowchart of a method of image processing according to a tenth embodiment of the present invention.

DESCRIPTION OF THE PREFERRED EMBODIMENTS

Figure 1:
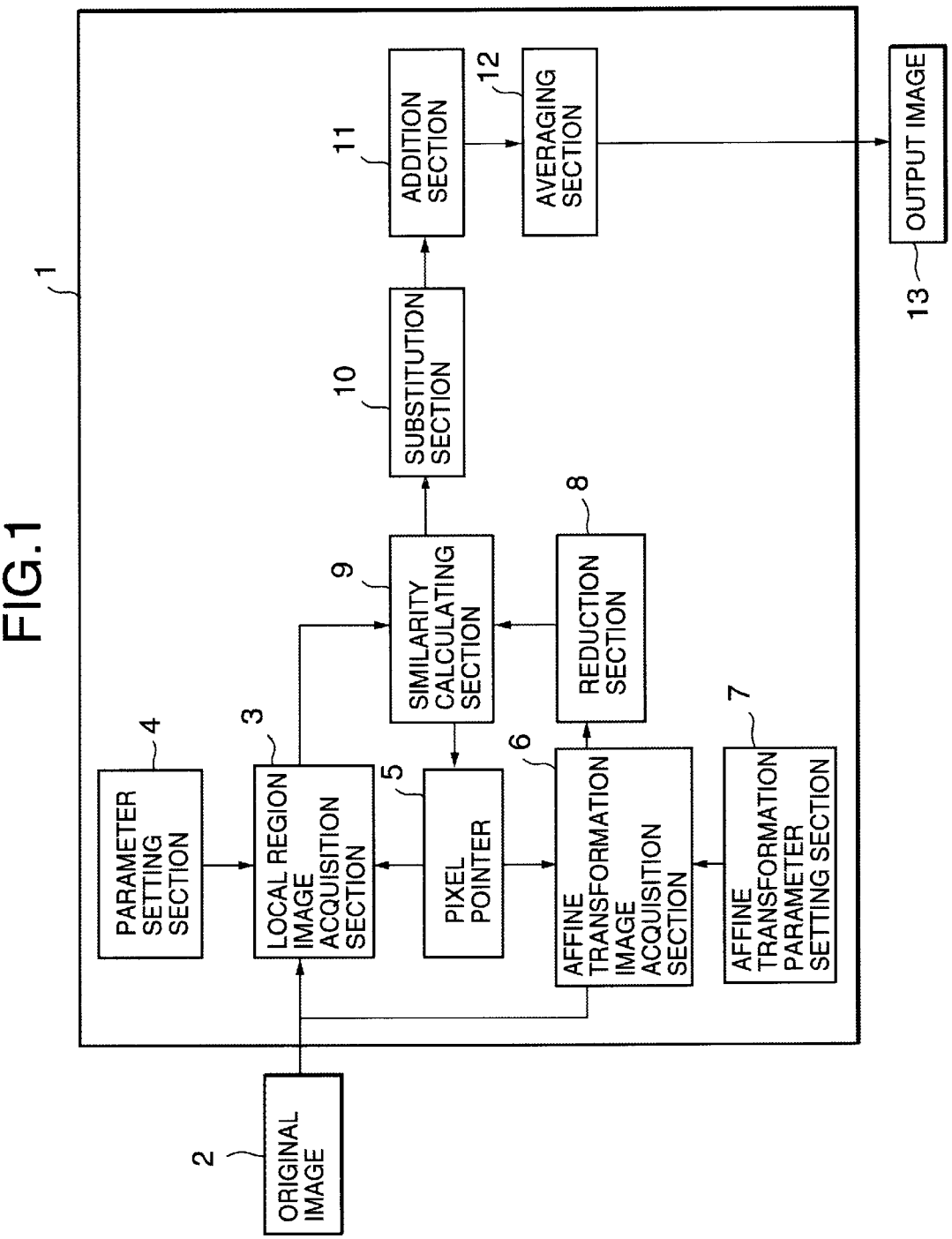
FIG. 1 is a block diagram of an image processing device according to a first embodiment of the present invention.

Embodiments of the present invention are described below with reference to FIG. 1 to FIG. 22. FIG. 1 to FIG. 6 illustrate an embodiment in accordance with the first aspect of the present invention, FIG. 7 to FIG. 11 illustrate an embodiment in accordance with the second aspect of the present invention, FIG. 12 to FIG. 15 illustrate an embodiment in accordance with the third aspect of the present invention and FIG. 16 to FIG. 22 illustrate an embodiment in accordance with the fourth aspect of the present invention, respectively.

1. First Embodiment

FIG. 1 to FIG. 4 are block diagrams illustrating the layout of an image processing device according to a first embodiment of the present invention.

A main image processing device 1 applies prescribed image processing to an original image that is input from original image holding section 2 and outputs this processed image to output image holding section 13. Original image holding section 2 and output image holding section 13 are constituted of memories etc. Original image holding section 2 and output image holding section 13 may be incorporated in the layout of image processing device 1, or may be respectively separately constructed from image processing device 1. For example, a PC card may provide original image holding section 2 and output image holding section 13, with the original image data being read from the PC card on which the original image is recorded and the processed image being written back to an empty region of the same PC card.

A local region image acquisition section 3 acquires local region images (i.e. original image blocks) of prescribed size from the original image. As will be described later with reference to FIG. 2, respective local region images are located at respective pixels of the original image, so that adjacent ones of the local region images overlap by a prescribed amount with each other. Local region image acquisition section 3 acquires the local region images using parameters which are set from parameter setting section 4. These parameters supply for example the size etc. of the local region image. Current pixel pointer 5 detects the position of the pixel (current pixel) that is currently being processed.

Affine transformation image acquisition section 6 detects and acquires from the original image on one or more images similar to each of the local region images. Affine transformation image acquisition section 6 uses the affine transformation parameters, which are set in affine transformation parameter setting section 7, to manipulate the image present at the periphery of each local region image to detect affine transformation images similar to each local region image.

Affine transformation image acquisition section 6 acquires affine transformation images of a size larger than the local region image, for example of double size in the vertical and horizontal directions. These extracted affine transformation images are reduced by reduction section 8 to the same size as the local region image. Similarity calculation section 9 calculates the distance between the local region image extracted by local region image extraction section 3 and each of the affine transformation images acquired by affine transformation image acquisition section 6 and reduced by reduction section 8, and calculates the degree of similarity of these two. For the distance calculation, the eigenvector distance may be calculated or, conveniently, the mean of squares may be taken.

One of the affine transformation images that is judged by similarity calculating section 9 to be most similar is selected as "a similar image block" for the local region image and then is substituted for the local region image, by a substitution section 10. This substitution process using the most similar affine transformation image is repeatedly performed with respect to every local region image. The substituted affine transformation images are added or integrated by addition section 11 so that adjacent ones of the substituted affine transformation images overlap by a prescribed amount with each other. Averaging section 12 effects adjustment by averaging the values of overlapping portions of the adjacent affine transformation images. The method of image adjustment of overlapping portions may be simple averaging or weighted averaging may be used. The image which has thus been adjusted is held in output image holding section 13. Enlargement processing, reduction processing, rotation processing, or color conversion processing etc may be performed after image adjustment.

Figure 2:
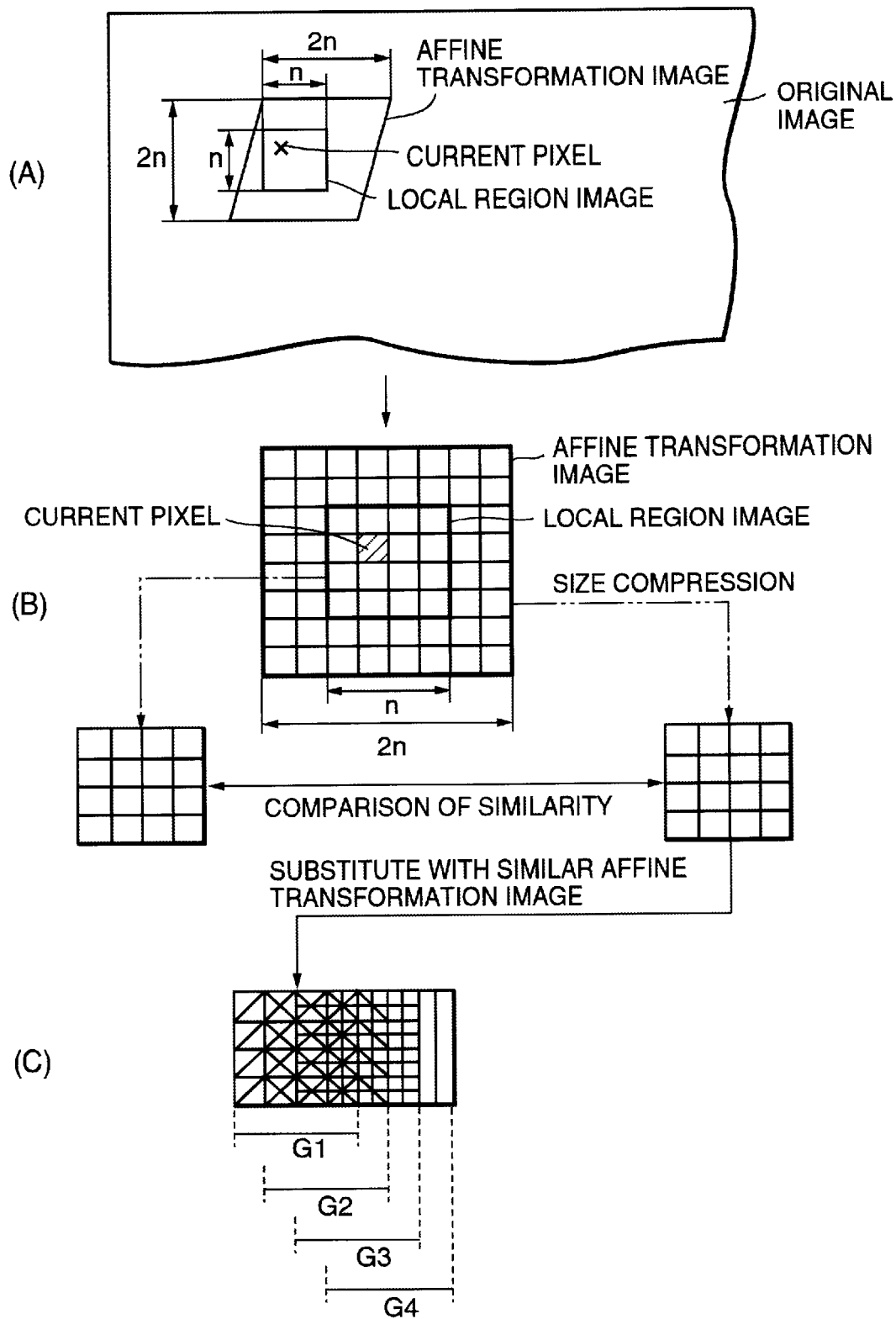
FIG. 2 is a diagram illustrating the essentials of image processing.

FIG. 2 is an explanatory view illustrating diagrammatically a method of image processing using the image processing device. As shown in FIG. 2(a), each pixel in the original image is selected one by one as a current pixel that is the subject of the current processing, a local region image is acquired with respect to the current pixel, and then affine transformation images similar to the local region image are searched and detected from the original image.

A acquired local region image is of for example n×n size, and located with its center approximately at the current pixel. The Figure shows by way of example the case where n=2. The detected affine transformation images are larger than the size of the local region image, with for example double the size (2n×2n) in the vertical and horizontal directions. In the embodiment, unless specifically indicated otherwise, the local region image and affine transformation images are square, but the present invention is not restricted to this. It would also be possible for these images to be set to other polygonal shapes, such as a rectangle or parallelogram etc.

It would also possible for affine transformation images similar to the local region image to be searched for from the entire region of the original image. However, as the search region is enlarged, processing time becomes longer. Also, depending on the size of the image block and/or the characteristics etc of the original image, there is sometimes a high likelihood of discovering similar image blocks at the periphery of a given original image block.

Accordingly, in this embodiment, instead of searching the entire original image, it is arranged to search for similar image blocks in only part of the original image, further restricted to the periphery of an image block. The size of the search region can be dynamically altered in accordance with the nature of the original image. If the size of the original image block is n×m, the size of the original image is Xmax, Ymax, and the size of the search region is αn×βm, the following relationships are established:

$n < \alpha n < X\text{max}$ \hfill (Numerical Expression 1)

$m < \beta m < Y\text{max}$ \hfill (Numerical Expression 2)

The values of the coefficients α, β that determine the size of the search region can be set at will in a range satisfying the above Numerical Expressions 1 and 2. However, the present invention is not restricted to this and it would be possible to search the entire original image.

As shown in FIG. 2(b), the detected affine transformation images ("candidate similar image blocks") larger than the local region image are reduced so as to be of the same size as the local region image. The distance between each of the size-reduced affine transformation images and the local region image is then calculated and the degree of similarity is calculated. One having the highest degree of similarity of the plurality of acquired affine transformation images is selected and then substituted for the local region image.

As shown in FIG. 2(c), adjacent images in the affine transformation images each substituted for each of the local region images overlap with each other. For example, as shown in the Figure, when those images are of 2-pixel×2-pixel size and located with offset by one pixel between each other, referring solely to the x direction, a maximum of four images G1 to G4 overlap. Likewise in the y direction, a maximum of four images overlap. Then, the overlapping portions of those images are adjusted by taking for example the simple mean of the respective pixel values.

Figure 3:
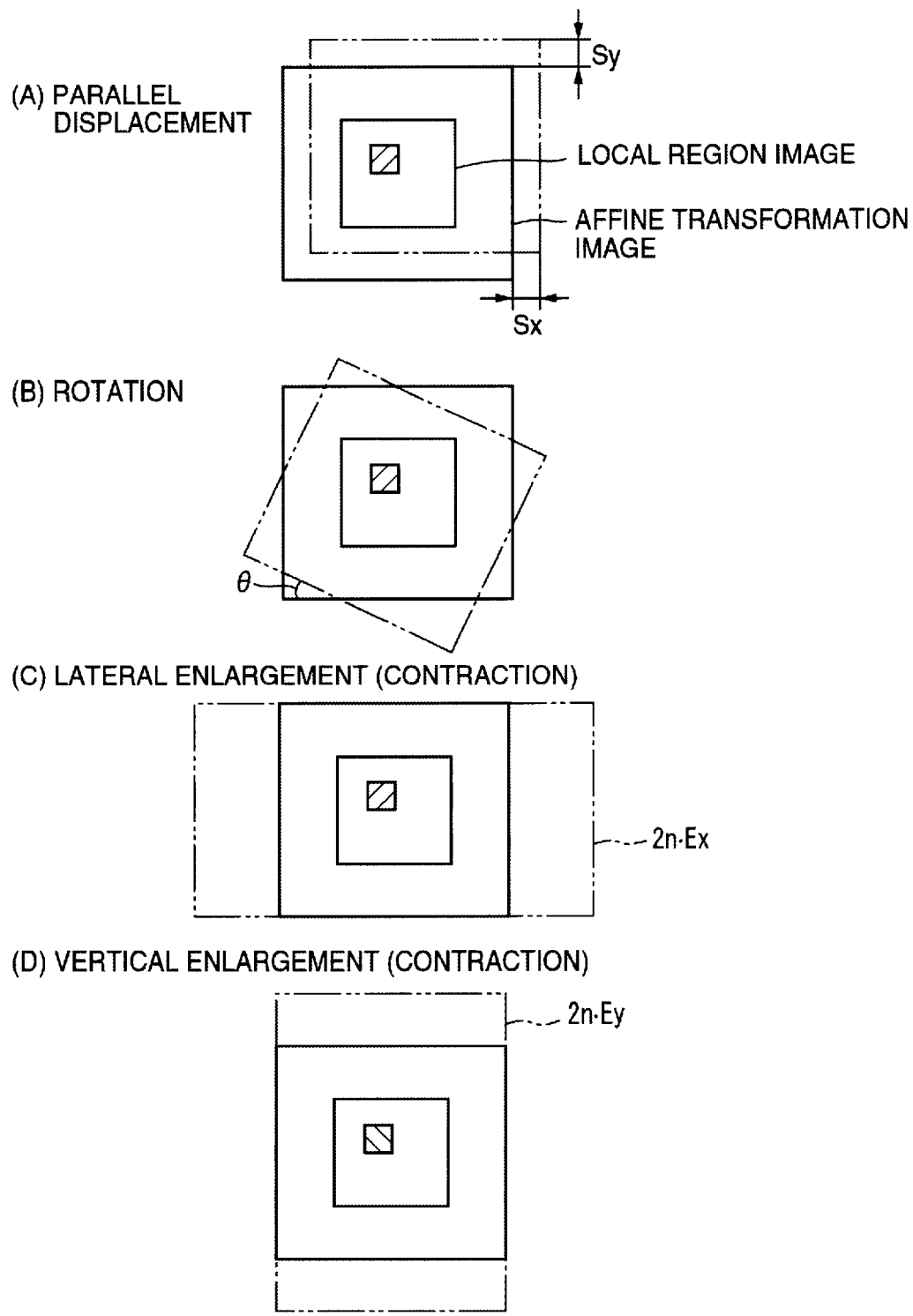
FIG. 3 is a diagram illustrating the essentials of affine transformation.

FIG. 3 is a diagram illustrating a method of image manipulation and parameters when the affine transformation images are acquired. As shown in FIG. 3(a), an image can be displaced in parallel by Sx, Sy. Also, an image can be rotated by an angle θ as shown in FIG. 3(b). Furthermore, as shown in FIG. 3(c), (d), an image can be enlarged or size-reduced in the x direction to Ex, or enlarged or size-reduced in the y direction to Ey.

Figure 4:
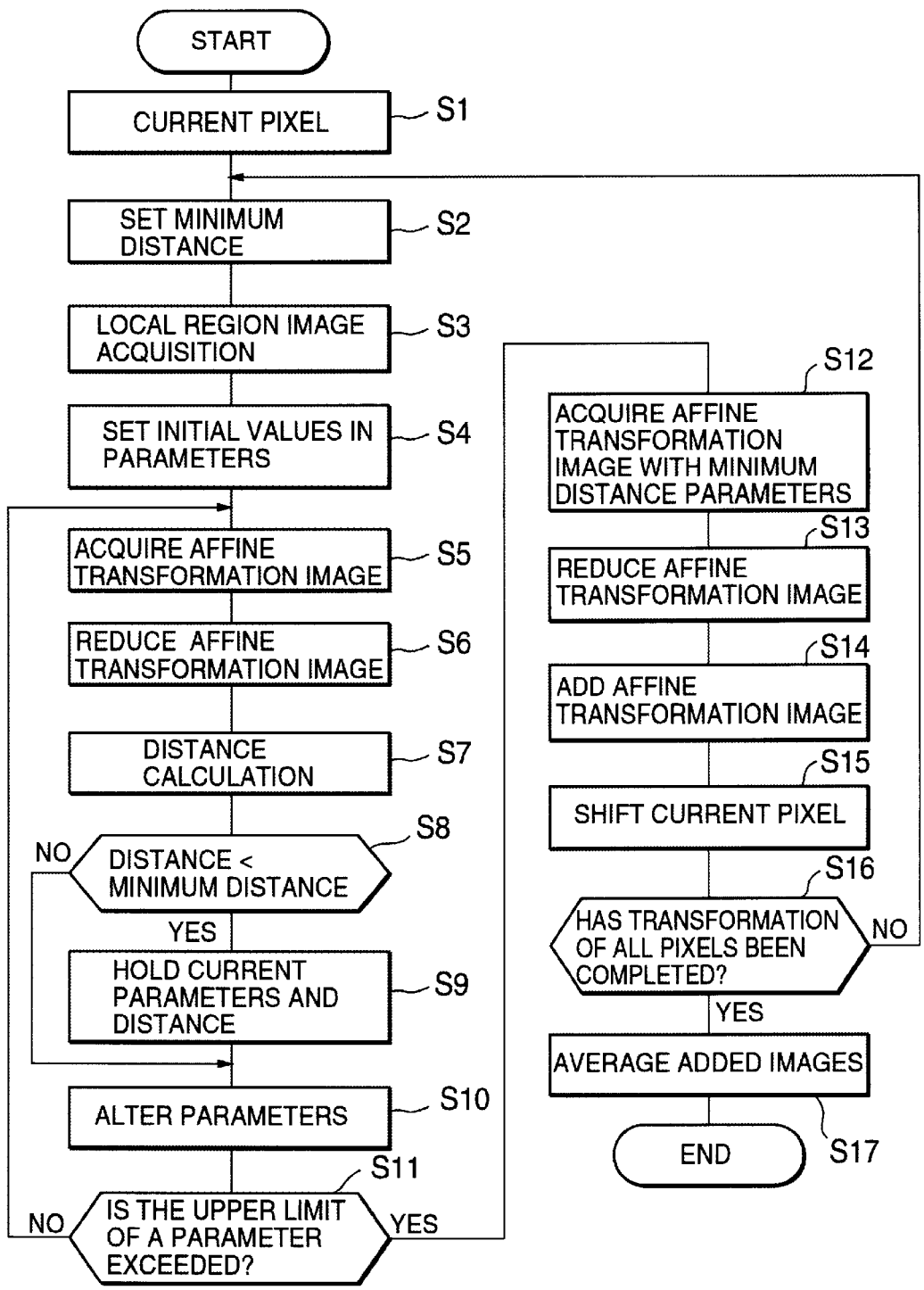
FIG. 4 is a flowchart illustrating a method of image processing.

Next, the action of this embodiment will be described with reference to the flowchart of FIG. 4. Hereinbelow, "step" is abbreviated to "S".

First of all, in S1, the current pixel coordinates (x, y) are set at the initial pixel coordinates (0, 0) in an inputted original image, and from the initial pixel starts the processing mentioned below. Then, the maximum value (S2) is set for the "minimum distance" for ascertaining similarity between each local image region and corresponding affine transformation images. Next, the local region image whose center is roughly at the current pixel is extracted (S3), and respective initial values are set (S4) for the affine transformation parameters (Sx, Sy, Ex, Ey, θ). It should be noted that the processing order of the steps could be altered so long as there is no effect on processing; this also applies to the other steps, to be described. Specifically, the processing order of S2 to S4 does not matter.

When one affine transformation images is acquired using the set parameters (S5), these acquired affine transformation images are reduced so as to be the same size as the local region image (S6). The image similarity distance between the local region image and each of the affine transformation images of the same size corresponding to this local region image is then calculated (S7) and it is ascertained (S8) whether or not this calculated distance is smaller than (i.e. is more similar than) the "minimum distance", which was set at S2. If the result of the latest calculated distance is smaller than the "minimum distance", the values of the latest affine transformation parameters and the latest calculated distance are held (S9). If the latest calculated distance is not smaller than the "minimum distance", this means that the acquired affine transformation image is not similar to the local region image, so its parameters and distance are not held.

The parameters are then altered by a prescribed amount (S10) and a check is made (S11) as to whether or not the range of variation of each parameter has been exceeded. If the check result at S11 is "NO", then another affine transformation image is acquired and its distance from the local region image is calculated (S5 to S11). The processing of S5 to S11 is repeated whilst altering the parameters from the initial values up to the maximum values. Then, in S9, of the affine transformation images obtained in the range of variation of the parameters, the affine transformation parameters and distance of the affine transformation image that is most similar to the local region image relating to the current pixel are held.

When each of the parameters has been altered up to the maximum limit, the affine transformation image that is most similar to the local region image is acquired (S12) using the parameters held in S9. The acquired affine transformation image is reduced (S13) to the same size as the local region image, and added to the previously acquired affine transformation images (S14) (i.e. stored at a prescribed location in a memory region).

The current pixel is then shifted to the next pixel (S15) and a decision is made (S16) as to whether affine transformation images have been acquired in respect of all the pixels of the original image. If processing of the entire original image has not yet been completed, processing returns to S2 and the processes of S2 to S16 are repeated. Although this embodiment was described assuming that affine transformation images were acquired for the entire original image, the present invention is not restricted to this. Acquisition processing of affine transformation images could be performed solely in respect of a prescribed region specified for example by the user.

When the affine transformation images similar to the corresponding local region images has been respectively obtained for all the pixels of the original image (S16: YES), the overlapping portions of the affine transformation images are averaged, thus producing an output image which is fractal-interpolated (S17). Further, when enlarging the output image, conventional interpolation processing such as linear interpolation can be performed on the output image.

With this embodiment constituted in this way, the following benefits are obtained.

Firstly, since local region images overlapping are acquired from the original image, and affine transformation images similar to these local region images are detected from the original image, and the affine transformation images are substituted for the overlapping local region images, it becomes possible to convert a low-quality image to a high-quality image.

Secondly, since the substituted affine transformation images are overlapping and their overlapping portions are adjusted by for example averaging etc, compared with the case where the affine transformation images are not overlapping, a feeling of disconformity at the joints between the substituted images can be prevented. Consequently, where for example the original image is a natural image etc, quality can be raised while maintaining a natural change of gradation.

Thirdly, if, instead of searching for affine transformation images similar to the local region images from the entire original image, searching is performed from the periphery of each of the local region images, an affine transformation image similar to the local region image can be obtained in a comparatively short time. Consequently, even when the number of affine transformation images to be detected is large, marked increase in the overall processing time can be prevented.

Fourthly, since, instead of the affine transformation images, the affine transformation parameters of the images are held in a memory when detecting the images, the detection process can be performed with little memory resources.

2. Second Embodiment

Figure 5:
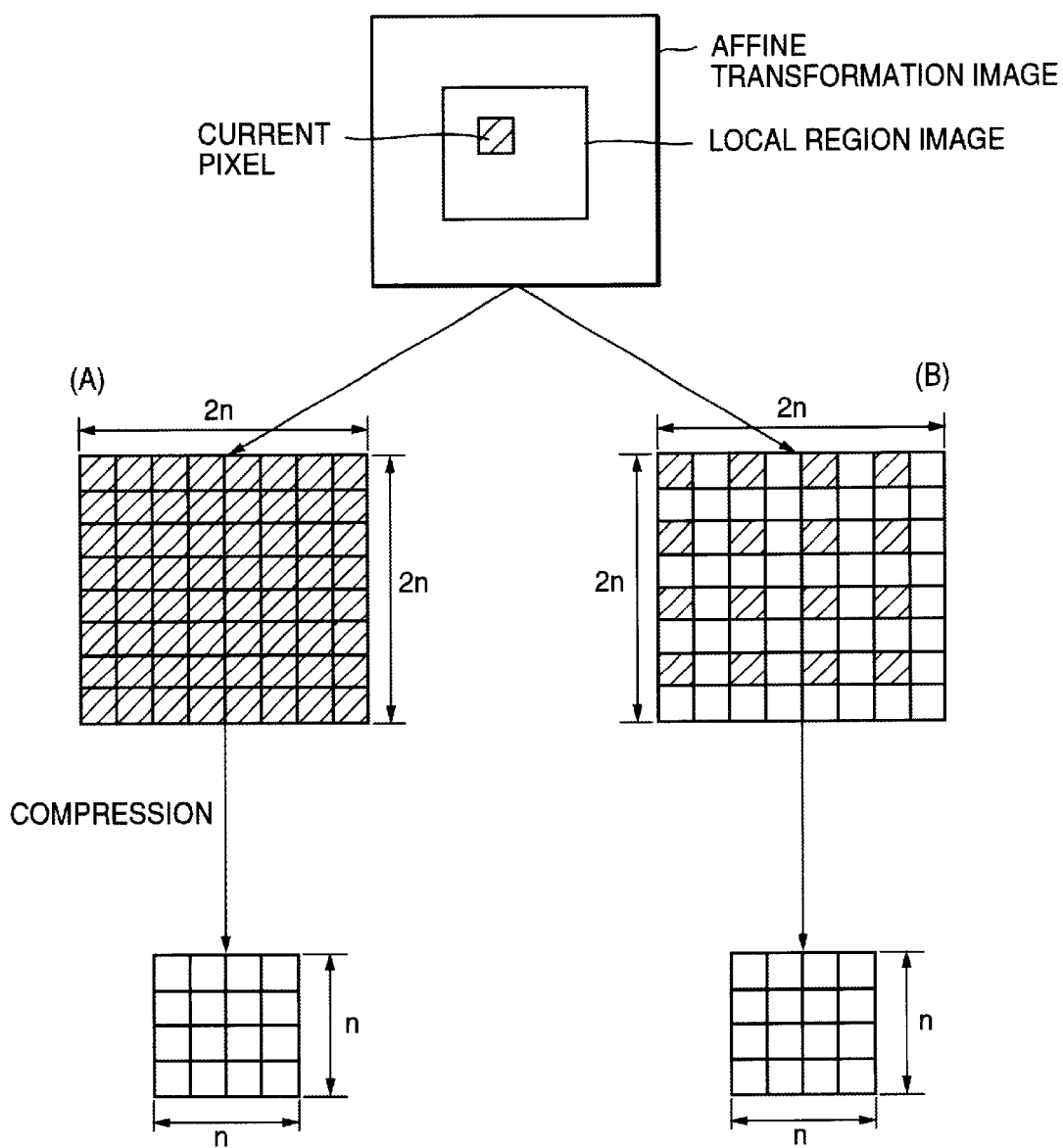
FIG. 5 is a diagram of a method of image processing according to a second embodiment of the present invention.

Next, a second embodiment of the present invention is described with reference to FIG. 5. In the following embodiments, structural elements which are the same as structural elements described above are given the same reference symbols and further description thereof is omitted. A characteristic feature of this embodiment is that an affine transformation image of the same size as the local region image is directly acquired by acquiring partial scattered pixels from the image region corresponding to the affine transformation image.

As shown in FIG. 5(a), an affine transformation image of the same size as the local region image can be obtained by acquiring an affine transformation image with size 2n×2n and reducing the size of this affine transformation image that is thus obtained.

In contrast, as shown in FIG. 5(b), from a region corresponding to an affine transformation image of size 2n×2n, instead of acquiring all the pixels in this region, the alternate pixels are acquired and directly constitute an affine transformation image of the same size as the local region image.

3. Third Embodiment

Figure 6:
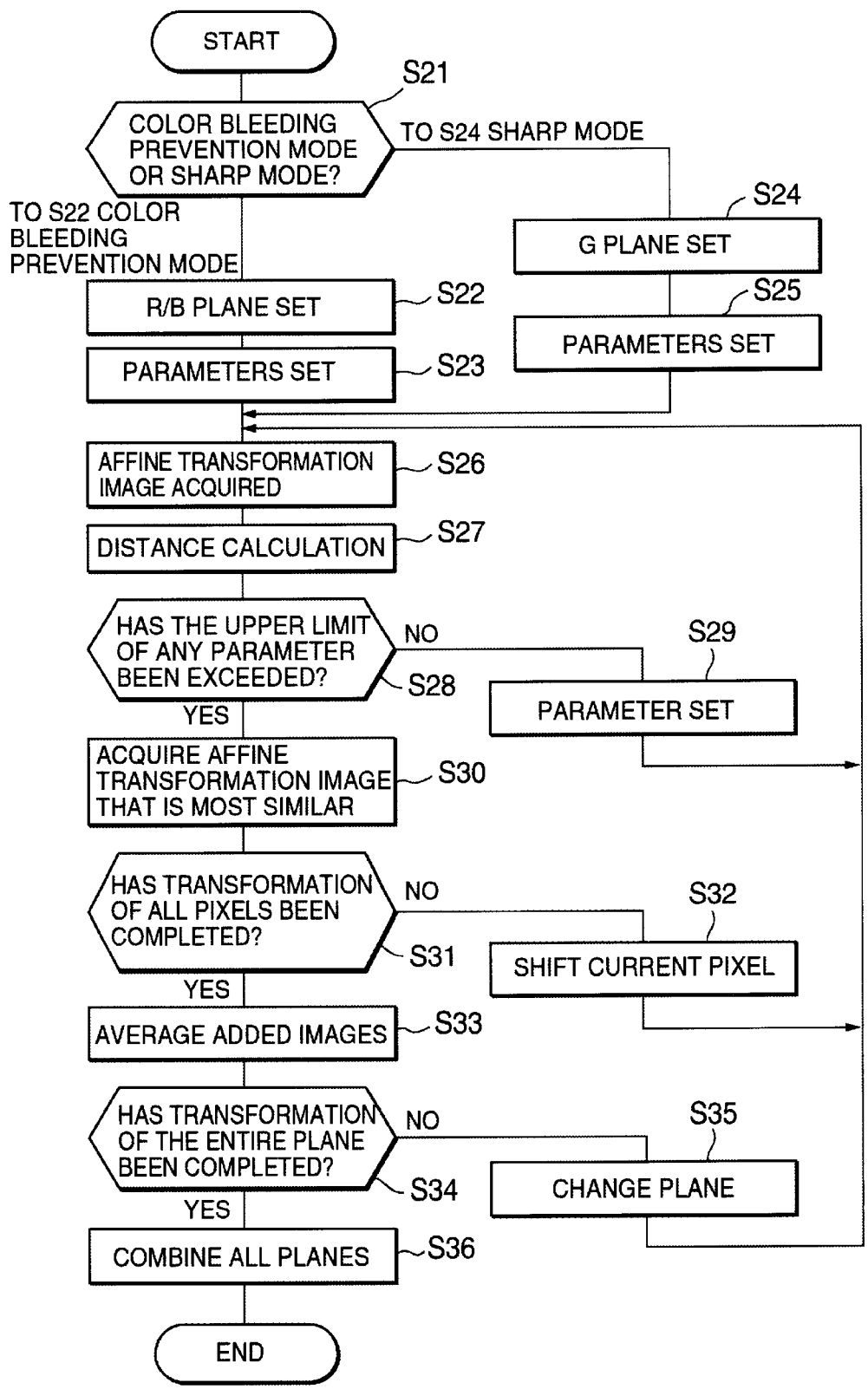
FIG. 6 is a flowchart of a method of image processing according to a third embodiment of the present invention.
Figure 7:
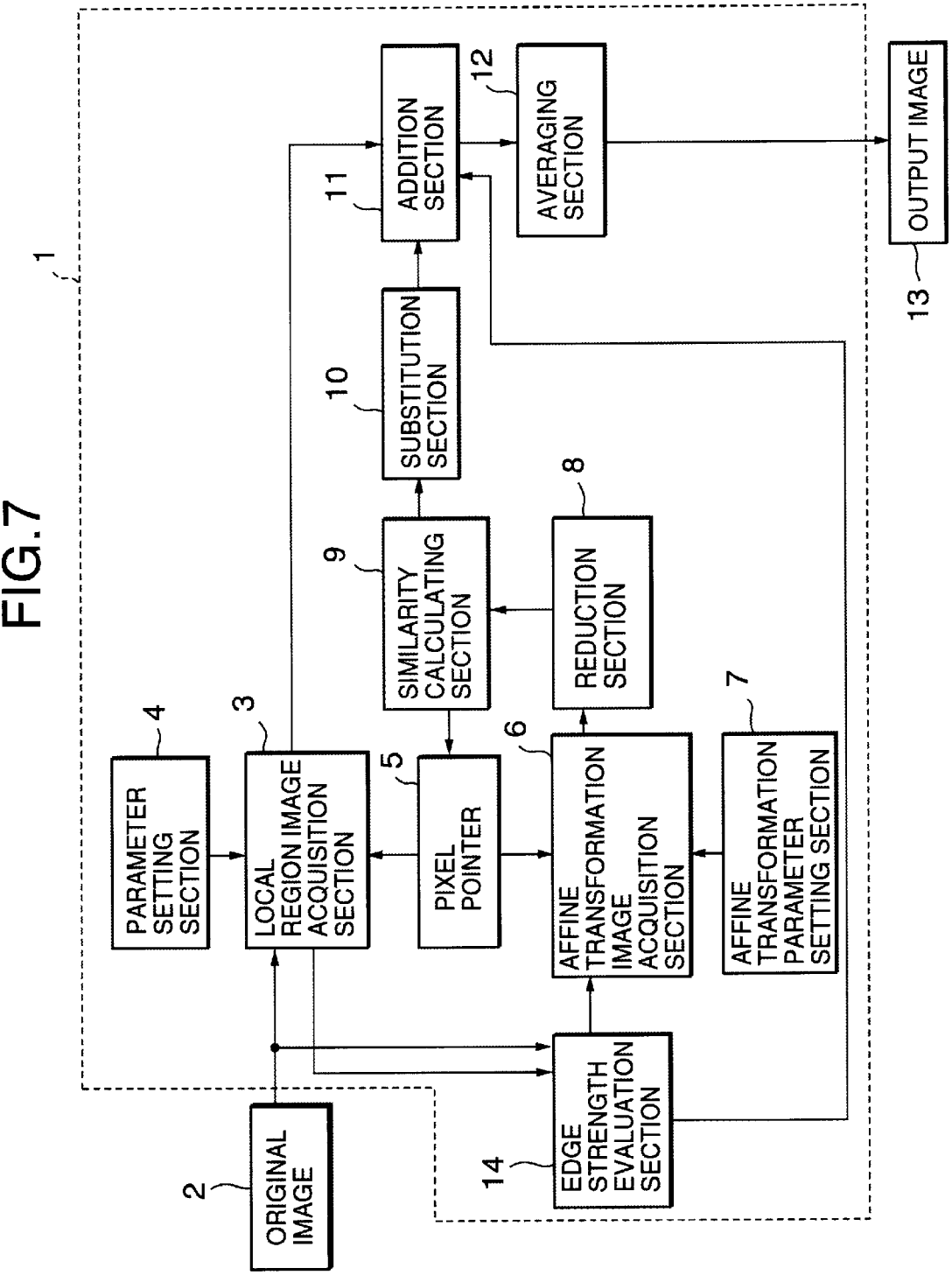
FIG. 7 is a block diagram of an image processing device according to a fourth embodiment of the present invention.

Next, a third embodiment of the present invention is described with reference to FIG. 6. A characteristic feature of this embodiment is that, based on properties of the original image etc, it is made possible to set the values of the affine transformation parameters for each color component.

First of all, when performing image improvement using the image processing device, the user can select exclusively (S21) either color bleeding prevention mode or sharp mode. In color bleeding prevention mode, the fractal interpolation according to the present invention is applied to the R component and B component of the original image represented by an RGB colorimetric system, in order to suppress color bleeding. In contrast, in sharp mode, the fractal interpolation is applied solely to the G component in order to make the outline etc of the image clear. For example, in a digital camera or the like in which a single unit is formed by in each case one R component pixel and B component pixel and two G component pixels, color bleeding prevention mode is applied for natural images and sharp mode is applied to images such as letters or line drawings, respectively.

When color bleeding prevention mode is selected, the R plane and B plane are set as the color planes that are to be the subject of the fractal interpolation (S22) and affine transformation parameters are set (S23) for these R and B planes. In contrast, when sharp mode is selected, the G plane is set as the plane that is to be the subject of the fractal interpolation (S24) and affine transformation parameters are set for this G plane (S25). The initial values and range of variability of the parameters that are set in S23 and S25 may be the same.

Then, in the same way as described in the first embodiment, affine transformation images are acquired (S26) with the set of affine transformation parameters and the distances from the local region image are calculated (S27). The processing of S26 and S27 is repeated (S28, S29) until variation of each of the parameters in the variable range has been completed. The affine transformation image that is most similar to the local region image relating to the current pixel is then acquired (S30). Processing of S26 to S30 is repeated (S31, S32) by shifting the current pixel until affine transformation images have been acquired for all the pixels of the original image.

When affine transformation images have been acquired for all the pixels of the original image, averaging is performed (S33) by adding the affine transformation images. In this way, the processing of a single plane is completed. Thereupon, it is ascertained (S34) whether or not there is any plane to be processed next; if there is still a remaining plane to be processed, processing is changed over to this plane and the processing described above is performed (S35). When processing of all the planes for which the fractal interpolation is specified has been completed, these are combined with the other planes to obtain the output image (S36).

Specifically, in the case of color bleeding prevention mode, the fractal interpolation according to the present invention is performed on the R plane and B plane image data and the result is synthesized with the G plane to obtain the output image. In this case, synthesis with the G plane may be performed after other interpolation processing such as linear interpolation, or may be performed without carrying out interpolation processing. Likewise, in the case of sharp mode, the fractal interpolation according to the present invention is performed solely on the G plane image data before synthesizing with the R plane and B plane.

In this way, image processing can be performed in accordance with the properties of the original image and/or the wishes etc of the user.

4. Fourth Embodiment

FIG. 7 to FIG. 11 are block diagrams illustrating the layout of an image processing device according to a fourth embodiment of the present invention.

Affine transformation image acquisition section 6 according to this embodiment, in response to instructions from an edge strength evaluation section 14, detects similar images only for the local region images that are judged to have an edge strength exceeding a prescribed reference value.

Addition section 11 of this embodiment adds the substituted affine transformation images and unsubstituted local region image.

Edge strength evaluation section 14 evaluates the degree of fractal character of each of the acquired local region images. Affine transformation image acquisition section 6 detects affine transformation images only for local region images whose degree of fractal character is evaluated as being high. The other local region images whose degree of fractal character is low are added in unmodified form to the affine transformation images. Edge strength may be employed as an indicator relating to the degree of the fractal character. This will be described later with reference to FIG. 9.

It should be noted that, in this embodiment, affine transformation images are not acquired for all the local region images, but only for local region images whose edge strength (the degree of the fractal character) is high. Therefore, the four images shown in FIG. 2(c) for example are not necessarily all affine transformation images. Affine transformation images may adjoin and overlap, original local region images may adjoin and overlap, and also affine transformation images and local region images may adjoin and overlap.

Next, the operation of this embodiment will be described with reference to FIG. 8 to FIG. 10.

Figure 8:
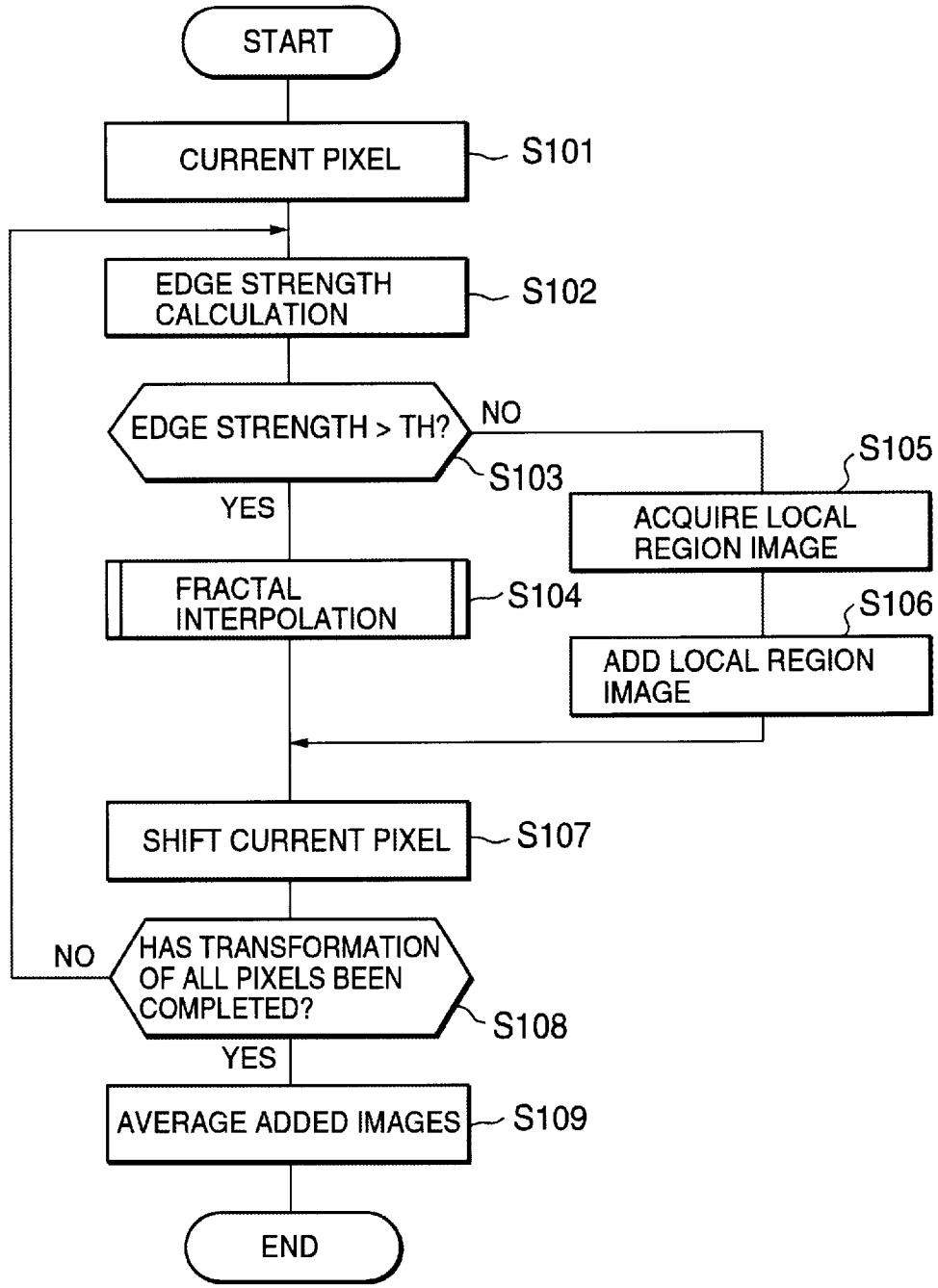
FIG. 8 is a flowchart illustrating a method of image processing.

FIG. 8 is a flowchart showing the overall flow of image processing. In S101, the initial pixel coordinates (0, 0) of the original image is set as the coordinates (x, y) of the current pixel, and from the initial pixel the processing starts. Next, the edge strength of the local region image centered on the current pixel is calculated (S102). As shown in FIG. 9, taking as an example the region of 3 pixels×3 pixels centered on current pixel Px5, the level difference (|Px1+Px2+Px3|−|Px7+Px8+Px9|) of the rows positioned above and below the current pixel and the level difference (|Px1+Px4+Px7|−|Px3+Px6+Px9|) of the rows positioned to the left and right of the current pixel are calculated as the edge strength (S102) and an evaluation is made as to whether or not these vertical and horizontal level differences are greater than a prescribed threshold value TH(S103). In this way, an evaluation is made as to whether or not there is a significant degree of the fractal character, by means of the edge strength of an region in the vicinity of the current pixel.

It is not necessarily essential to make the size of the region for edge strength evaluation and the size of the local region image coincide. For example, if a 4 pixels×4 pixels local region image is acquired centered on the current pixel, the edge strength could be evaluated in a region of 3 pixels×3 pixels centered on the current pixel or the edge strength could be evaluated in a region of 5 pixels×5 pixels. In this embodiment, the edge strength evaluation region and the local region image sizes are described as being the same.

If the calculated edge strength exceeds the prescribed reference value TH (S103: YES), the fractal interpolation is performed (S104) as described with reference to FIG. 10. On the other hand, if the edge strength is no more than the prescribed reference value (S103: NO), the local region image is acquired (S105), and this acquired local region image is added without modification (S106).

Next, the current pixel is shifted to the next pixel (S107), and a decision is made as to whether or not one or other of the affine transformation image or local region image has been acquired in respect of all the pixels of the original image (S108). If processing of the entire original image has not yet been completed, processing returns again to S102 and the various processes described above are repeated.

When, for all the pixels of the original image, respectively corresponding local region images or affine transformation images similar to the local region image have been acquired and added (S108: YES), the overlapping portions of the images are averaged to produce an output image (S109).

Figure 10:
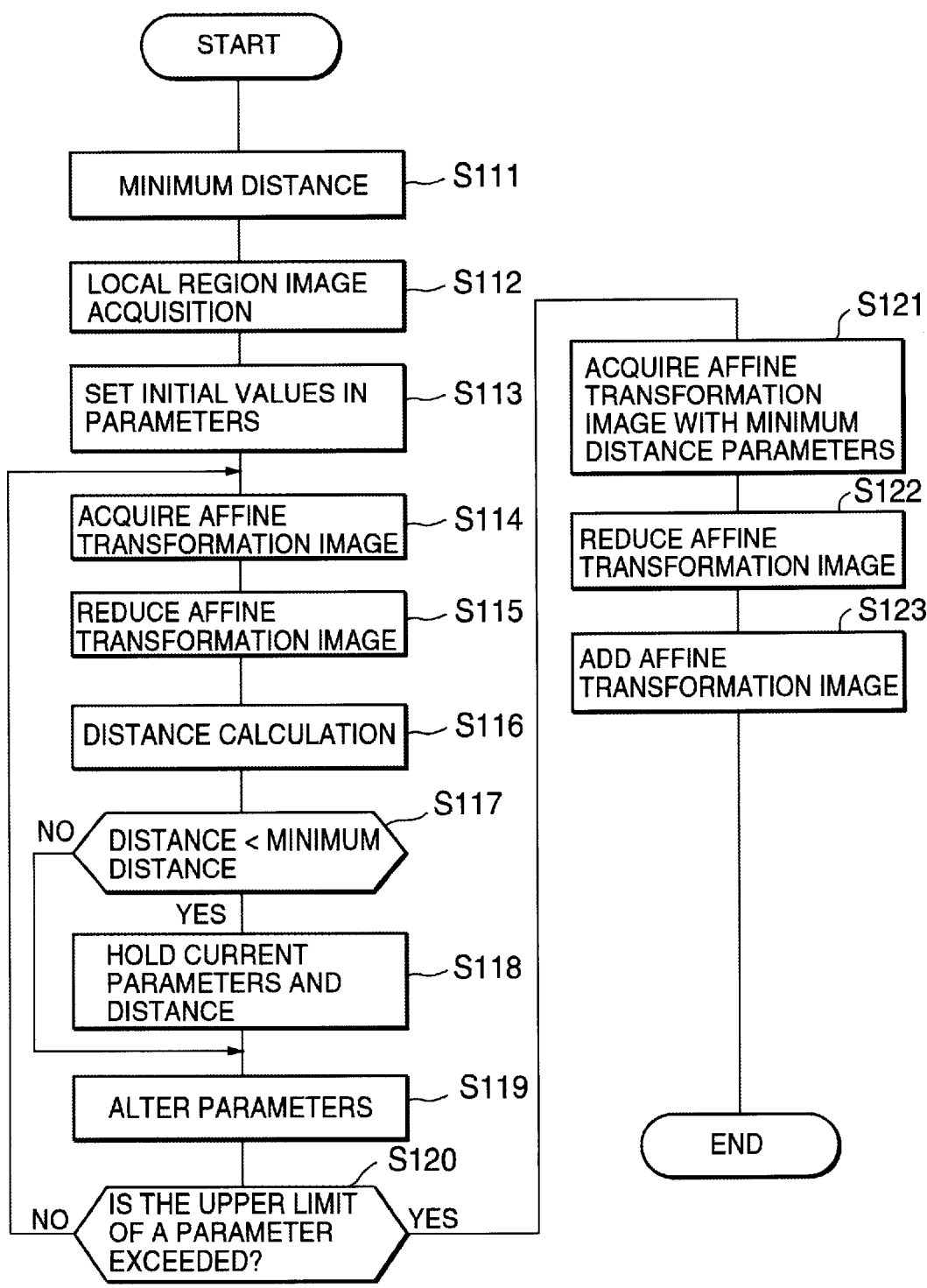
FIG. 10 is a flowchart illustrating the flow of specific processing for the fractal interpolation illustrated in FIG. 8.

Next, FIG. 10 is a flow chart showing the flow of the fractal interpolation processing illustrated as S104 in FIG. 8. These steps S111 to S123 correspond to steps S2 to S14 in FIG. 4.

First of all, the maximum value is set (S111) as the "minimum distance" for evaluation of similarity of the local region image and affine transformation images. The local region image centered on the current pixel is extracted (S112) and the parameters (Sx, Sy, Ex, Ey, θ) for affine transformation are respectively set to their initial values (S113).

When one affine transformation images is acquired (S114) using the set parameters, the acquired affine transformation image is reduced so as to become the same size as the local region image (S115). The distance between the local region image and the affine transformation image of the same size corresponding to the local region images is then calculated (S116), and an evaluation is made (S117) as to whether or not this calculated distance is smaller than the values set as the parameter "minimum distance" for similarity evaluation i.e. whether they are similar. If the latest distance calculation result is smaller than the "minimum distance", the values of the latest affine transformation parameters and the latest distance are held (S118). If the latest distance is not smaller than the "minimum distance", this means that the acquired affine transformation image is not similar to the local region image, so the values of the parameters and the distance are not held.

The parameters are then varied by a prescribed amount in (S119) and a check is made (S120) as to whether or not the variation range of the parameters has been exceeded. That is, affine transformation images are acquired one by one whilst varying the parameters from their initial values up to the maximum value, and the distance between each acquired affine transformation and the local region image is calculated (S114–S120). Consequently, in S118, the affine transformation parameters and distance of the affine transformation image that is most similar to the local region image relating to the current pixel are held.

If the parameters have been altered up to the maximum limit, an affine transformation image is acquired (S121) that is most similar to the local region image, using the parameters held in S118. The acquired affine transformation image is then reduced (S122) to the same size as the local region image, and is added to the previously acquired affine transformation image (S123) (i.e. stored at a prescribed location in a memory region).

In this way, in respect of the local region image that have a significant degree of the fractal character, the affine transformation images similar to these local region images are detected and added (i.e. substituted for these local region imagea). On the other hand, in respect of the other local region images that not have a significant degree of the fractal character, acquisition of affine transformation images is not performed and the original local region images are added directly.

With this embodiment constructed in this way, the following benefits are obtained.

Firstly, since local region images overlapping are acquired, and only for the local region images of high fractal character, affine transformation images similar to these local region images are detected and substituted for these local region images, it becomes possible to convert a low-quality image to a high-quality image.

Secondly, since affine transformation images are detected only for the local region images where fractal character is high, processing time can be shortened compared with the case where affine transformation images are acquired for all the local region images.

Thirdly, since the added images overlap and the overlapping portions are processed by averaging etc, compared with the case where the added images do not overlap, a feeling of disconformity at the joints between the images can be prevented. Consequently, where for example the original image is a natural image etc, quality can be raised while maintaining a natural change of gradation.

Fourthly, if, instead of searching for affine transformation images from the entire original image, searching is performed in the periphery of the local region image, an affine transformation images can be obtained in a comparatively short time. Consequently, even when the number of affine transformation images to be detected is large, marked increase in the overall processing time can be prevented.

Fifthly, an affine transformation images can be obtained with little memory resources, since the affine transformation parameters are held in a memory and the affine transformation images are then acquired using the affine transformation parameters after completion of the searching process.

5. Fifth Embodiment

Figure 11:
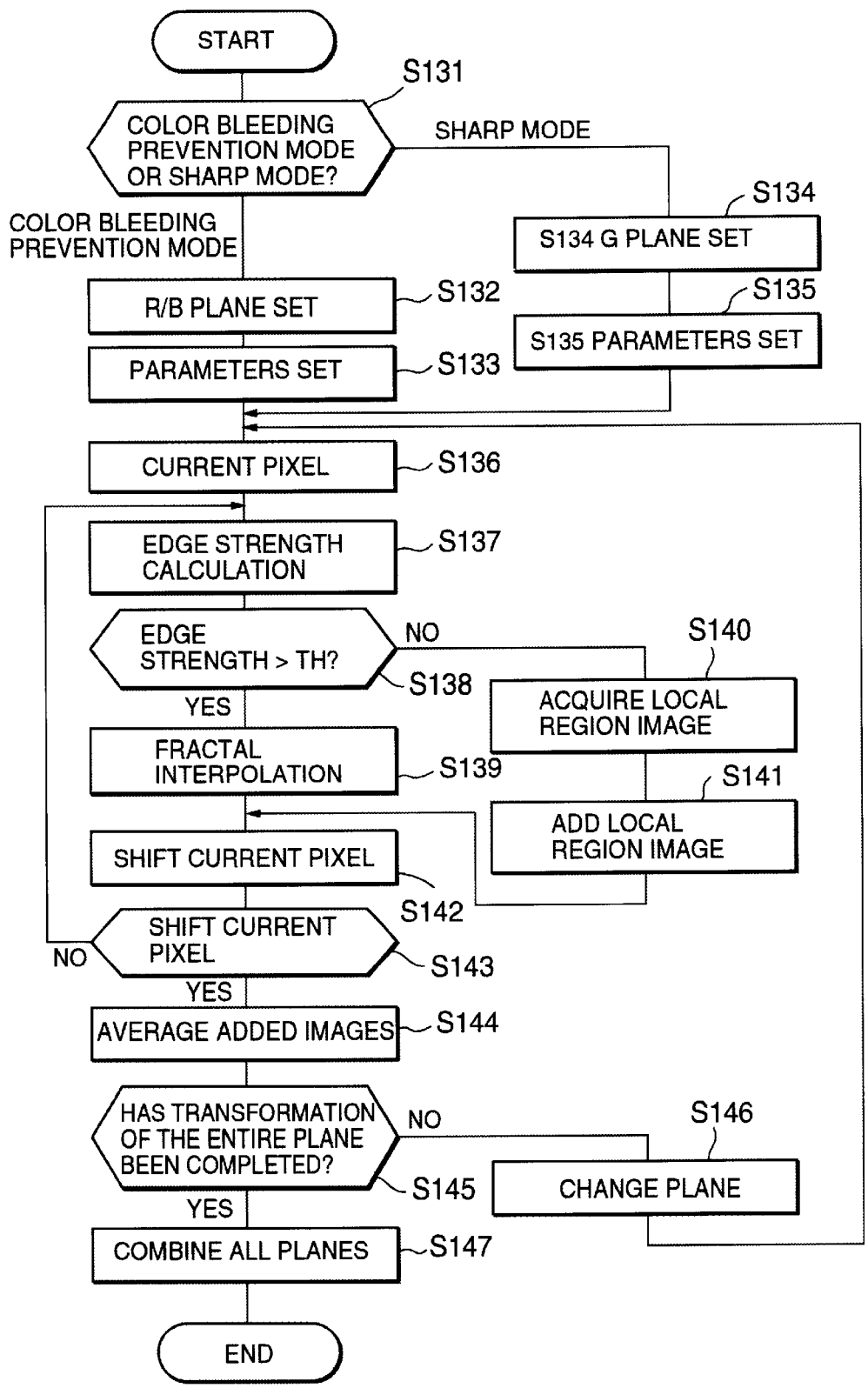
FIG. 11 is a flowchart of a method of image processing according to a fifth embodiment of the present invention.

Next, a fifth embodiment of the present invention is described with reference to FIG. 11. A characteristic feature of this embodiment is that it is made possible to set the values of the affine transformation parameters for each color component, depending on the characteristics etc of the original image.

First of all, when performing image improvement using the image processing device, the user can exclusively select color bleeding prevention mode or sharp mode (S131).

When color bleeding prevention mode is selected, the R plane and B plane are set as the color planes that are to be the subject of the fractal interpolation (S132) and affine transformation parameters are set (S133) for these R and B planes. In contrast, when sharp mode is selected, the G plane is set as the plane that is to be the subject of the fractal interpolation (S134) and affine transformation parameters are set for this G plane (S135). The initial values and range of variability of the parameters that are set in S133 and S135 may be the same.

Then, after setting (S136) the initial values of the current pixel in the same way as described above, the edge strength of the local region image centered on the current pixel is calculated (S136, S137). If the calculated edge strength exceeds the prescribed reference value TH (S138: YES), the fractal interpolation is performed (S139); if the edge strength is no more than the reference value TH (S138: NO), the acquired local region image is added without modification (S140, S141). The aforesaid processes are repeated (S142, S143) until processing has been completed in respect of all pixels of the original image.

When affine transformation images or local region images have been acquired in respect of all the pixels of the original image (S143: YES), the pixels are averaged by adding (S144). Processing of one plane is thereby completed. Thereupon, it is ascertained (S145) whether or not there is any plane to be processed next; if there is still a remaining plane to be processed, processing is changed over to this plane and the processing described above is performed (S146). When processing of all the planes for which the fractal interpolation is specified has been completed, these are combined with the other planes to obtain the output image (S147).

6. Sixth Embodiment

Figure 12:
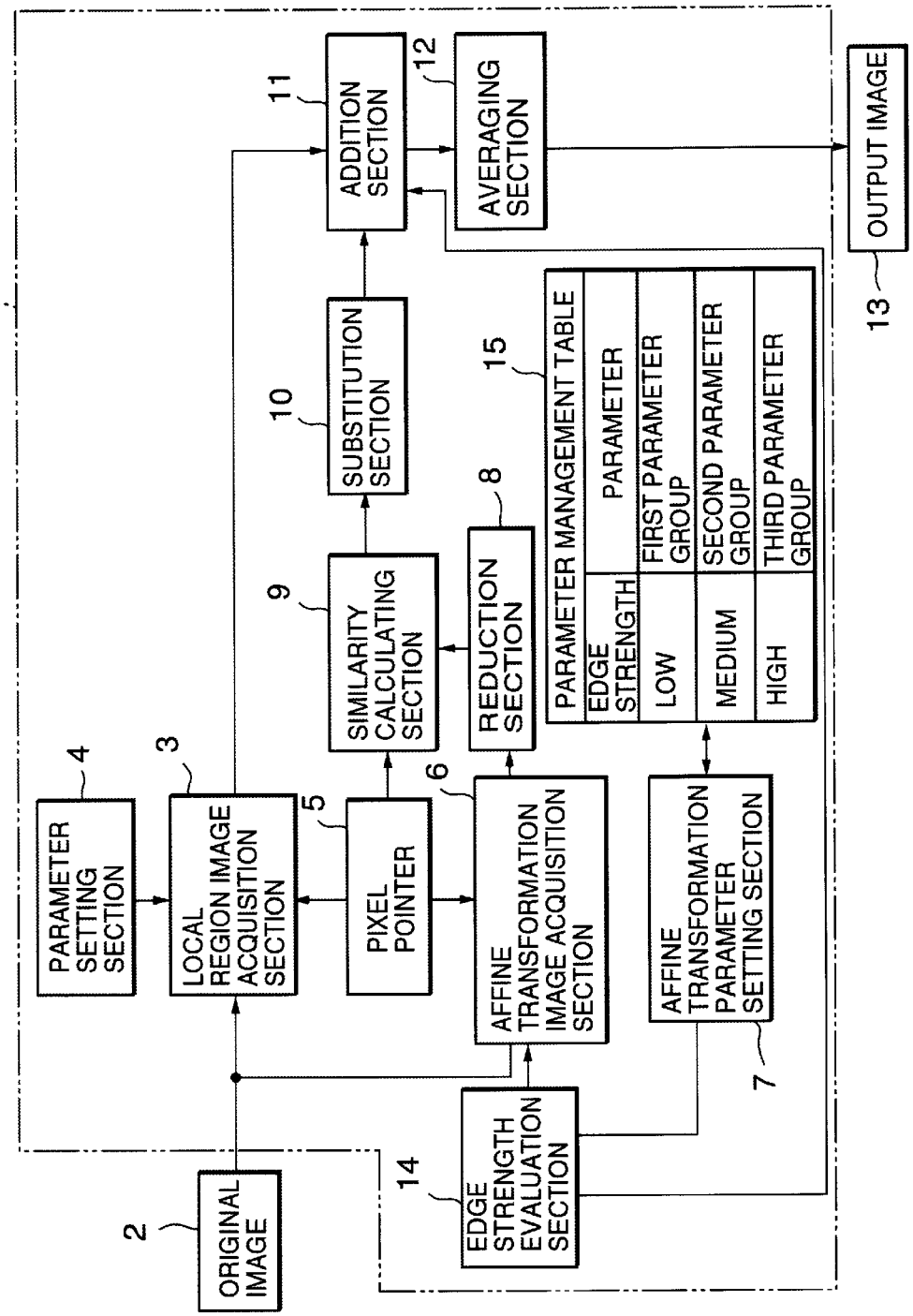
FIG. 12 is a block diagram of an image processing device according to a sixth embodiment of the present invention.
Figure 13:
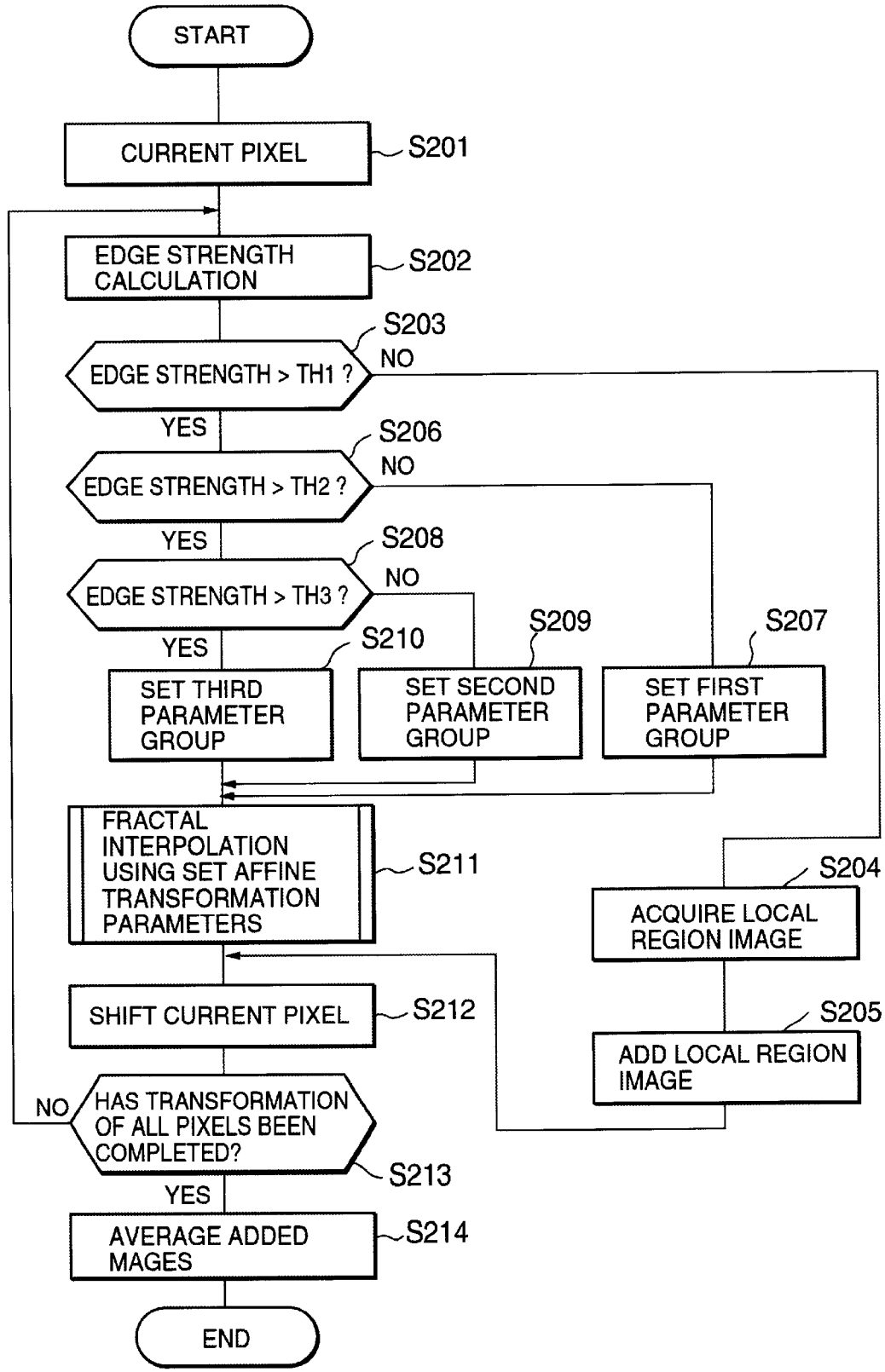
FIG. 13 is a flowchart illustrating a method of image processing.

FIG. 12 to FIG. 14 are block diagrams illustrating the layout of an image processing device according to a sixth embodiment of the present invention.

Affine transformation image acquisition section 6 according to this embodiment detects and acquires from the original image images similar to these local region images from within a search region depending on the edge strength of the local region image, based on the evaluation results from edge strength evaluation section 14.

Parameter management table 15 performs management by associating edge strength and affine transformation parameters. In parameter management table 15, affine transformation parameter groups are respectively associated with each level of edge strength, for example "low", "medium" and "high". Affine transformation parameter setting section 7 acquires prescribed affine transformation parameter groups from parameter management table 15 in accordance with the edge strength that is input from edge strength evaluation section 14 and sets these acquired affine transformation parameter groups in affine transformation image acquisition section 6. In this way, affine transformation image acquisition section 6 acquires the affine transformation images that are most similar to each said local region image, in a search region corresponding to the edge strength of the local region images. Also, if the edge strength of the local region image is below the prescribed reference value, affine transformation image acquisition section 6 does not acquire an affine transformation image in respect of this local region image.

In regard to local region images whose degree of fractal character is evaluated as exceeding a prescribed reference value, affine transformation image acquisition section 6 detects the affine transformation image using affine transformation parameters dependent on the edge strength of this local region image. Local region images whose degree of fractal character is no more than the prescribed reference value are directly added to the affine transformation images.

Next, the operation of this embodiment will be described with reference to FIG. 13 and FIG. 14.

First of all, FIG. 13 is a flowchart showing the overall flow of image processing. In S201, (0, 0) is set as the coordinates (x, y) of the current pixel, and from the first pixel of the original image the processing starts. Next, the edge strength of the local region image centered on the current pixel is calculated (S202). As described above with reference to FIG. 9, the level difference of the rows arranged above and below the current pixel, and the level difference of the rows arranged to left and right of the current pixel are detected, and the edge strength is calculated from these (S202). That is, the degree of the S fractal character is evaluated using the edge strength of the periphery of the current pixel.

Next, ranking is carried out (S203, S206, S208) as to which level the calculated edge strength corresponds to. That is, it is respectively ascertained whether the edge strength is no more than level TH1 constituting the "prescribed reference value" (S202), or whether the edge strength exceeds level TH1 but is no more than the next level TH2 (S206) or whether the edge strength exceeds level TH2 but is no more than the maximum level TH3 (S208).

Next, as shown in FIG. 14, in accordance with the detected edge strength, it is decided whether or not affine transformation images are to be acquired and, if affine transformation images are to be acquired, the range of search.

(1) Case Where Edge Strength≦TH1

If the edge strength is no more than level TH1 (S203: NO), local region images are acquired (S204), and these acquired local region images are directly added (S205). As shown in FIG. 14(a), the local region images are directly employed, and affine transformation images are not detected.

(2) Case Where TH1<Edge Strength≦TH2

In the case where the edge strength exceeds level TH1 but is not more than level TH2 (TH2>TH1) (S206: NO), the first affine transformation parameter group for "low" edge strength is set (S207) in affine transformation image acquisition section 6. As a result, affine transformation images similar to the local region image in a wide search region are detected as shown in FIG. 14(b).

(3) TH2<Edge Strength≦TH3

If the edge strength exceeds TH2 and is not more than level TH3 (TH3>TH2) (S208: NO), the second affine transformation parameter group for "medium" edge strength is set in affine transformation image acquisition section 6

(S209). In this way, as shown in FIG. 14(c), affine transformation images similar to the local region image are detected in a search region of medium size.

(4) TH3<Edge Strength

If the calculated edge strength exceeds level TH3 (S208: YES), the third affine transformation parameter group for "high" edge intensities is set (S210) in affine transformation image acquisition section 6. In this way, as shown in FIG. 14(d), affine transformation images similar to the local region image are detected in a small search region.

When the affine transformation parameters are set as described above in accordance with the edge strength possessed by the local region image, the fractal interpolation is performed (S211) using these affine transformation parameters. The fractal interpolation is performed as described above with reference to FIG. 10.

The current pixel is then shifted to the next pixel (S212) and an evaluation is made (S213) as to which of the affine transformation images or local region images has been acquired in respect of all pixels of the original image. If processing of the entire original image has not yet been completed, the processing described above is repeated by returning once more to S202.

If, for all the pixels of the original image, local region images respectively corresponding thereto or affine transformation images similar to the local region images have been acquired and added (S213: YES), averaging is performed in respect of overlapping portions of the images, to obtain an output image (S214).

In this way, in respect of local region images whose degree of fractal character is higher than the threshold value TH1, of all the local region images acquired from the original image, affine transformation images similar to these local region images are detected from a prescribed search region in the original image and substituted and added. On the other hand, in respect of local region images whose degree of fractal character is no more than reference value TH1, acquisition of affine transformation images is not performed and the original local region images are added directly.

With this embodiment constructed as above, the following benefits are obtained.

Firstly, since local region images overlapping are acquired, and, in respect of local region images of fractal character higher than a prescribed threshold value TH1, affine transformation images similar to these local region images are detected and substituted, it becomes possible to convert a low-quality image to a high-quality image.

Secondly, since the search region for detection of affine transformation images is set in accordance with the edge strength of the local region image, it suffices to detect affine transformation images in search regions responsive to the degree of fractal character, so processing speed is improved and image processing time can be shortened. Although a large number of local region images are acquired, processing time can be shortened by variably setting the search region in accordance with edge strength.

Thirdly, since affine transformation images are only acquired if the degree of fractal character is higher than a prescribed threshold value TH1, processing time can be shortened compared with the case where affine transformation images are acquired in respect of all the local region images. Consequently, coupled with the arrangement for variable setting of the search region as aforesaid, even higher speed processing can be achieved.

Fourthly, since the images are overlapping and the overlapping portions are processed by averaging etc, compared with the case where the images are not overlapping, a feeling of disconformity at the joints between the images can be prevented. Consequently, where for example the original image is a natural image etc, quality can be raised while maintaining a natural change of gradation.

Fifthly, since affine transformation parameters are held in a memory and affine transformation images are acquired using these held affine transformation parameters after completion of the searching process, affine transformation images can be obtained with small memory resources.

7. Seventh Embodiment

Figure 15:
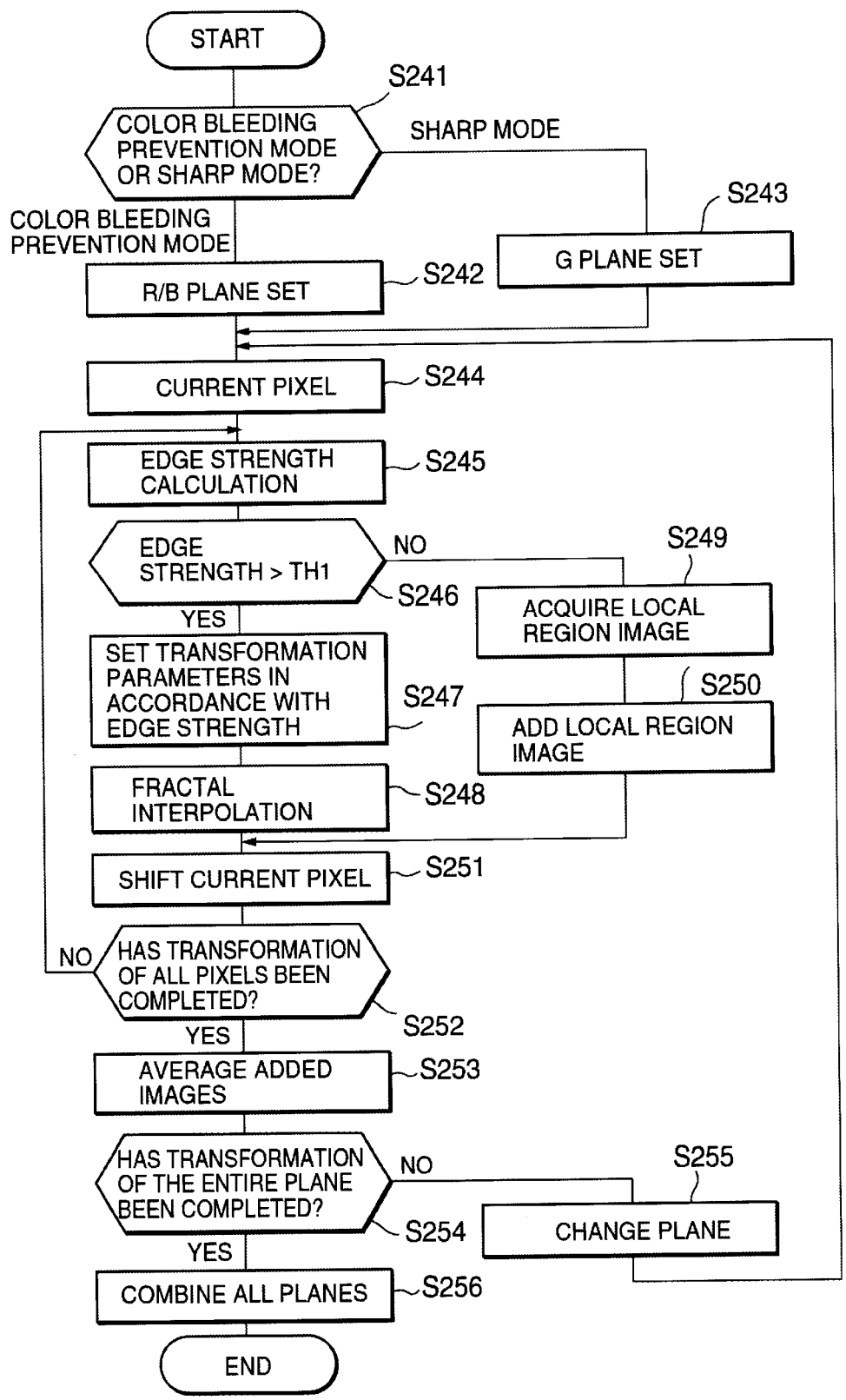
FIG. 15 is a flowchart of a method of image processing according to a seventh embodiment of the present invention.

Next, a seventh embodiment of the present invention is described with reference to FIG. 15. A characteristic feature of this embodiment is that it is made possible to set the values of the affine transformation parameters for each color component in accordance with the characteristics etc of the original image.

First of all, when performing image improvement using the image processing device, the user can select exclusively (S241) either color bleeding prevention mode or sharp mode.

If color bleeding prevention mode is selected, the R plane and B plane are set (S242) as the color planes that are to be the subject of the fractal interpolation. In contrast, when sharp mode is selected, the G plane is set as the plane that is to be the subject of the fractal interpolation (S243).

Then, after setting (S244) the initial values of the current pixel in the same way as described above, the edge strength of the local region image centered on the current pixel is calculated (S245, S246). If the calculated edge strength exceeds the prescribed reference value TH1 (S246: YES), the fractal interpolation is performed (S247, S248) using affine transformation parameters responsive to the edge strength; if the edge strength is no more than the reference value TH1 (S246: NO), the acquired local region image is added without modification (S249, S250). The aforesaid processes are repeated (S251, S252) until processing has been completed in respect of all pixels of the original image.

When affine transformation images or local region images have been acquired in respect of all the pixels of the original image (S252: YES), the pixels are averaged by adding (S253). Processing of one plane is thereby completed. Thereupon, it is ascertained (S254) whether or not there is any plane to be processed next; if there is still a remaining plane to be processed, processing is changed over to this plane and the processing described above is performed (S255). When processing of all the planes for which the fractal interpolation is specified has been completed, these are combined with the other planes to obtain the output image (S256).

8. Eighth Embodiment

Figure 16:
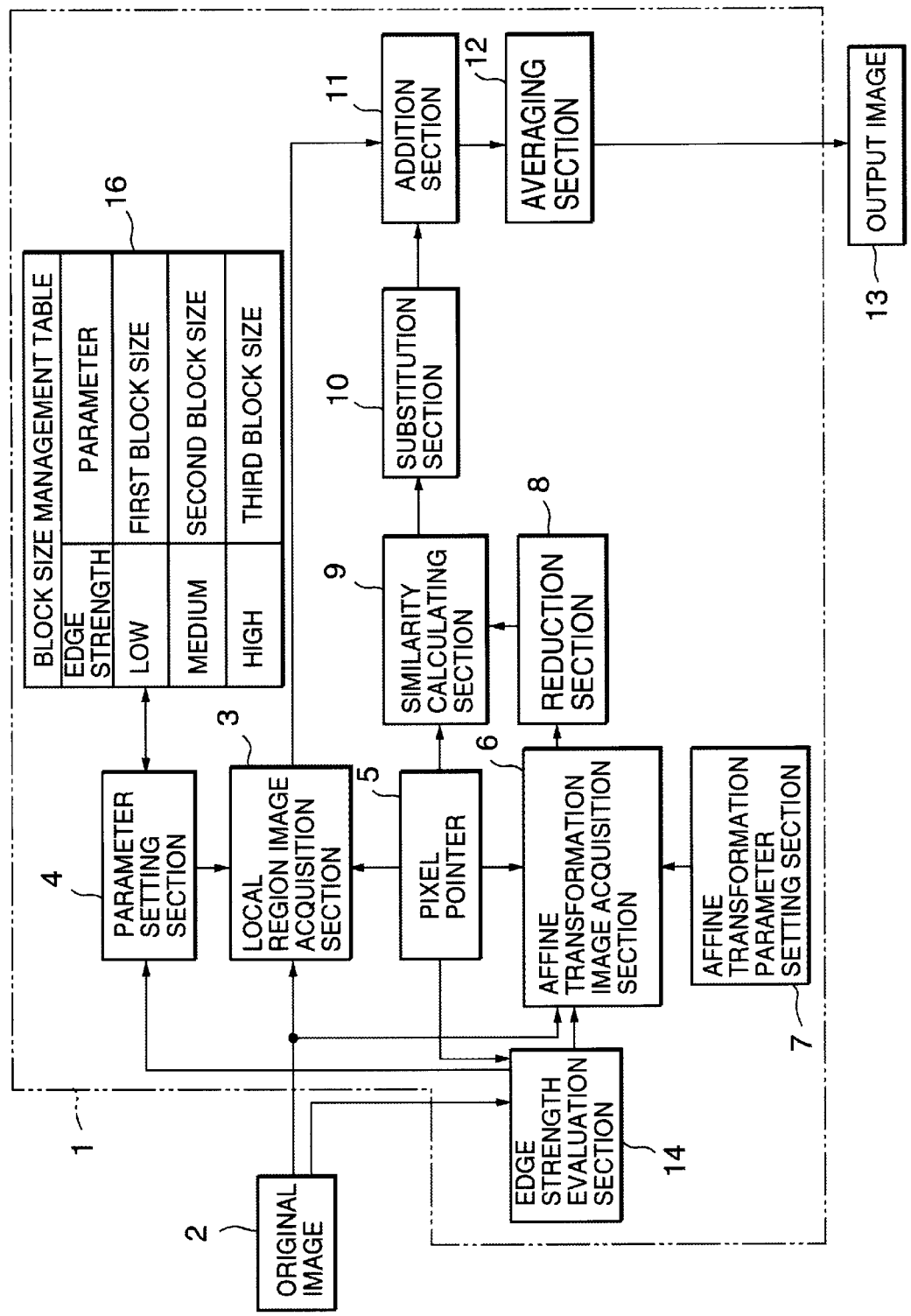
FIG. 16 is a block diagram of an image processing device according to an eighth embodiment of the present invention.
Figure 17:
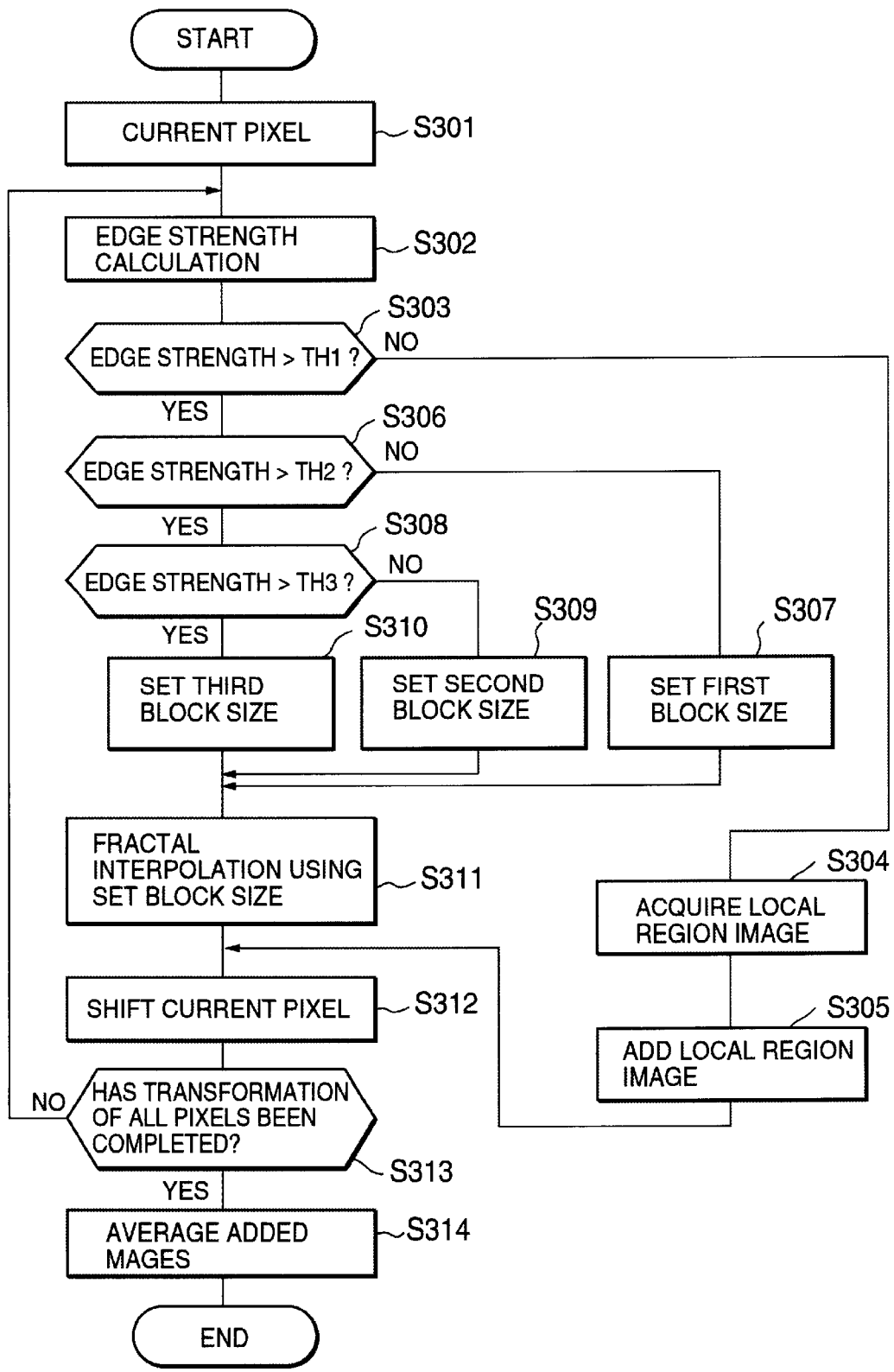
FIG. 17 is a flowchart illustrating a method of image processing.

FIG. 16 to FIG. 18 are block diagrams illustrating the layout of an image processing device according to an eighth embodiment of the present invention.

A local region image acquisition section 3 acquires local region images of prescribed size responsive to the edge strength in accordance with the parameters for local region image acquisition that are set from parameter setting section 4. Specifically, parameter setting section 4 refers to a block size management table 16 in accordance with the edge strength that is input from edge strength evaluation section 14. Block sizes corresponding to the edge strength of the image at the current pixel periphery are set in local region image acquisition section 3. In block size management table 16, local region image acquisition sizes are respectively associated with each level of edge strength, for example "low", "medium" and "high".

Affine transformation image acquisition section 6 detects and acquires from the original image images similar to the local region images acquired by local region image acquisition section 3.

Affine transformation image acquisition section 6 detects affine transformation images similar to the local region image relating to the current pixel only if the edge strength of the image at the periphery of this current pixel exceeds the prescribed reference value, based on the evaluation results from edge strength evaluation section 14.

Edge strength evaluation section 14 evaluates the degree of fractal character possessed by the image at the periphery of current pixel. As the degree of the fractal character, in this embodiment, "edge strength" is employed. The edge strength is as described with reference to FIG. 9. The evaluated edge strength is input to parameter setting section 4.

Next, the operation of this embodiment is described with reference to FIG. 17 and FIG. 18.

FIG. 17 is a flowchart illustrating the overall flow of image processing.

In S301, (0, 0) is set as the coordinates (x, y) of the current pixel. Next, the edge strength is calculated (S302) for the image at the periphery of the current pixel. In S302, the edge strength possessed by the image of the periphery of the current pixel is calculated in order to determine the acquisition size of the local region image.

It should be noted that the size of the image region for the edge strength evaluation and the size of the local region image do not necessarily coincide. This is because the size of the local region image changes in accordance with the edge strength.

Next, ranking is carried out (S303, S306, S308) as to which level the calculated edge strength corresponds to. That is, it is respectively ascertained whether the edge strength is no more than level TH1 constituting the "prescribed reference value" (S303), or whether the edge strength exceeds level TH1 but is no more than the next level TH2 (S306) or whether the edge strength exceeds level TH2 but is no more than the maximum level TH3 (S308).

Next, as shown in FIG. 18, in accordance with the detected edge strength, it is decided whether or not the local region image block size and affine transformation images are to be acquired.

(1) Case Where the Edge Strength≦TH1

If the edge strength is no more than level TH1 (S303: NO), as shown in FIG. 18(a), local region images are acquired with previously set initial block size NS (S304), and these acquired local region images are directly added (S305).

(2) Case Where TH1<Edge Strength≦TH2

In the case where the edge strength exceeds level TH1 but is not more than level TH2 (TH2>TH1) (S306: NO), as shown in FIG. 18(b), the local region image is acquired (S307) with the first block size N1 for "low" edge strength. It should be noted that, although, in FIG. 18, the initial block size NS and the first block size N1 are both set at a value of 4 pixels, these two sizes need not necessarily coincide. It would alternatively be possible to set the initial block size NS larger than the first block size N1.

(3) TH2<Edge Strength≦TH3

If the edge strength exceeds TH2 and is not more than level TH3 (TH3>TH2) (S308: NO), as shown in FIG. 18(c), the local region image is acquired (S309) with the second block size N2 for a "medium" edge strength.

(4) TH3<Edge Strength

If the calculated edge strength exceeds level TH3 (S308: YES), as shown in FIG. 18(d), the local region image is acquired with the third block size N3 for "high" edge strength (S310).

When the block size is set as described above in accordance with the edge strength, the local region image is acquired with this block size and the fractal interpolation is performed (S311) using the acquired local region image.

The current pixel is then shifted to the next pixel (S312) and an evaluation is made (S313) as to which of the affine transformation images or local region images has been acquired in respect of all pixels of the original image. If processing of the entire original image has not yet been completed, the processing described above is repeated by returning once more to S302.

If, for all the pixels of the original image, local region images respectively corresponding thereto or affine transformation images similar to the local region images have been acquired and added (S313: YES), averaging is performed in respect of overlapping portions of the images, to obtain an output image (S314). It should be noted that enlargement etc of the images obtained by this transformation can be performed by further conventional interpolation processing such as linear interpolation.

The fractal interpolation processing has already been described with reference to FIG. 10, so description thereof is omitted.

In this way, of all the local region images acquired from the original image, affine transformation images similar to local region images from a prescribed search region in the original image, whose degree of fractal character is higher than reference value TH1, are detected, substituted and added. On the other hand, in the case of local region images whose degree of fractal character is no more than the reference value TH1, affine transformation image acquisition is not performed and the original local region images are directly added.

With this embodiment constructed in this way, the following benefits are obtained.

Firstly, since local region images overlapping are acquired, and affine transformation images similar to these local region images whose fractal character is higher than a prescribed reference value TH1 are detected from the original image and substituted for these local region images, it becomes possible to convert a low-quality image to a high-quality image.

Secondly, since the block size of the local region images is set in accordance with the edge strength, the time required for similarity evaluation etc can be shortened. Specifically, as the edge strength becomes higher, the size of the local region images becomes smaller, so the number of pixels is decreased, making it possible to reduce the amount of calculation. Although a large number of local region images are acquired, by variably setting the block size of the local region images in accordance with the edge strength, processing time can be shortened compared with the case where the original image is simply divided and substitution effected with similar images.

Thirdly, since affine transformation images are acquired only in cases where the degree of fractal character is higher than a prescribed reference value TH1, processing time can be shortened compared with the case where affine transformation images are acquired in respect of all the local region images. Consequently, coupled with a construction in which the block size of the local region images is variably set, even more rapid processing can be achieved.

Fourthly, since the images are overlapping and the overlapping portions are processed by averaging etc, compared with the case where the images are not overlapping, a feeling of disconformity at the joints between the images can be prevented. Consequently, where for example the original image is a natural image etc, quality can be raised while maintaining a natural change of gradation.

Fifthly, an affine transformation image similar to the local region image can be obtained with little memory resources, since the affine transformation parameters are held in a memory and the affine transformation image is then acquired using the affine transformation parameters after completion of the searching process.

9. Ninth Embodiment

Next, a ninth embodiment of the present invention is described with reference to FIG. 19. A characteristic feature of this embodiment is that block size of the local region images and the affine transformation image search region are set in accordance with edge strength.

Figure 19:
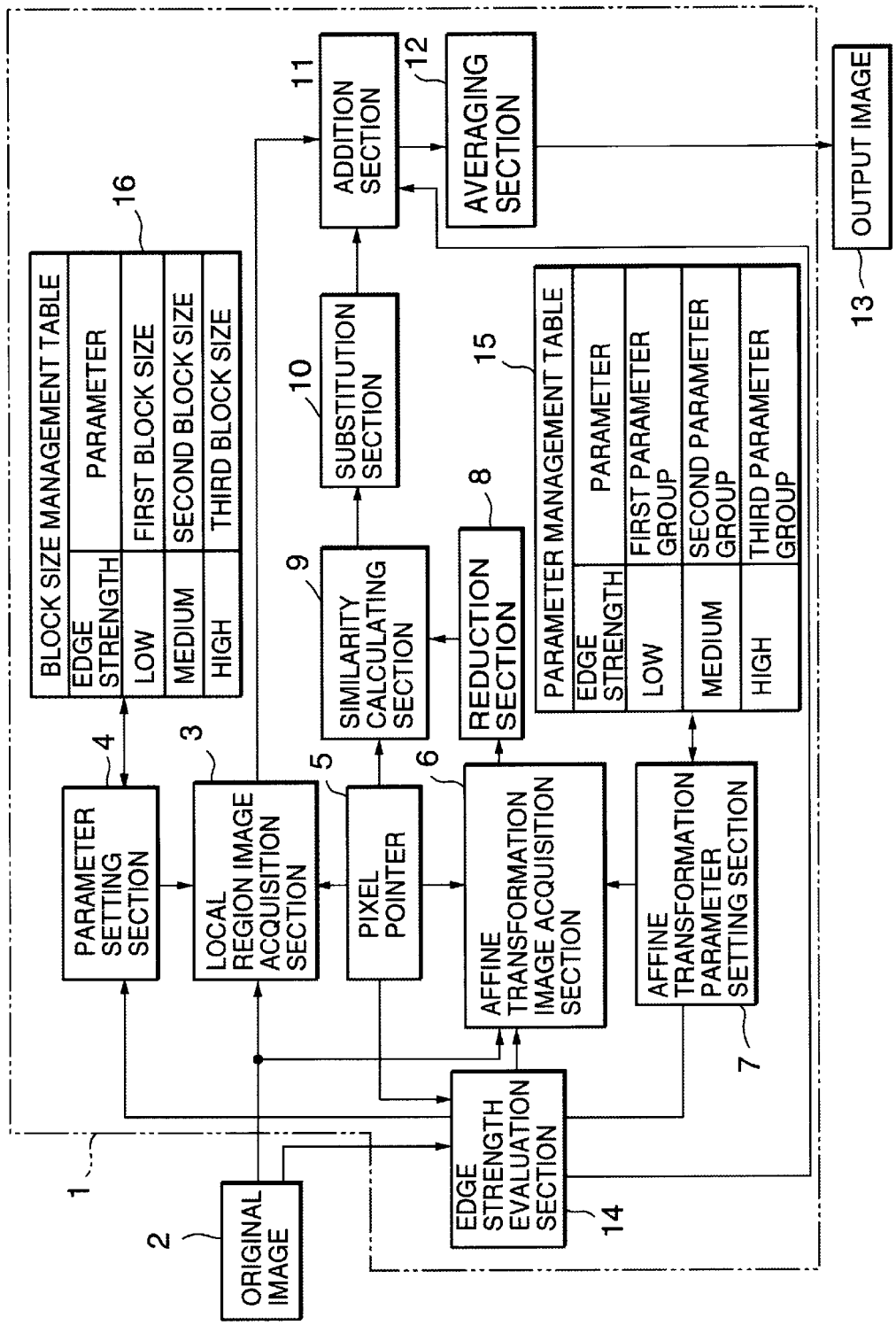
FIG. 19 is a block diagram of an image processing device according to a ninth embodiment of the present invention.

As shown in FIG. 19, in image processing device 1 according to this embodiment, a parameter management table 15 is further provided in the same way as in the embodiment described with reference to FIG. 12. Parameter management table 15 performs management by associating parameter groups for affine transformation purposes with each edge strength. The maximum values and minimum values of the various parameters Sx, Sy, θ, Ex, and Ey described with reference to FIG. 3 are registered in the form of a group in parameter management table 15. That is, each parameter group is constituted of: Sxmax, Sxmin, Symax, Symin, θmax, θmin, Exmax, Exmin, Eymax and Eymin.

Figure 20:
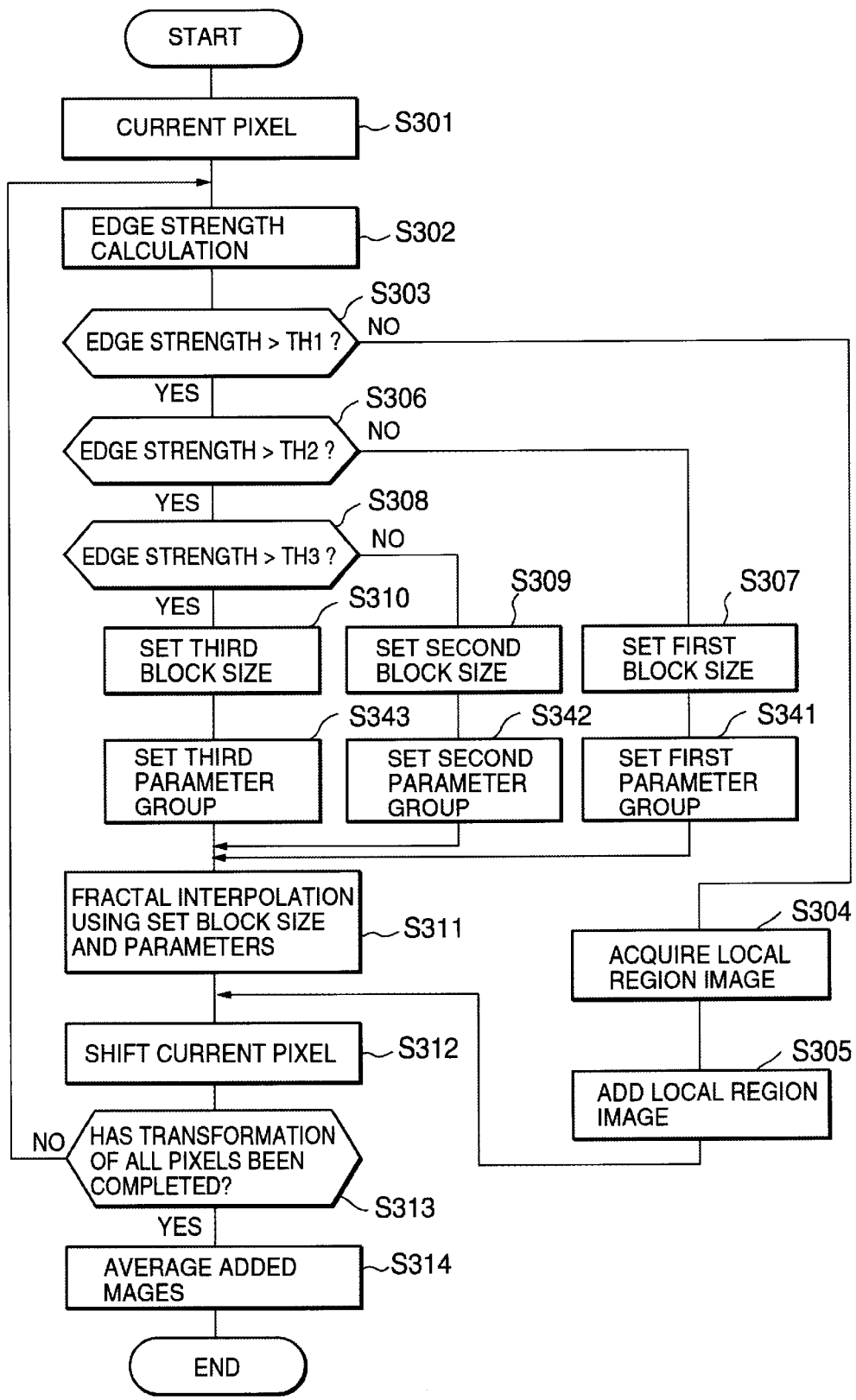
FIG. 20 is a flowchart illustrating a method of image processing.

FIG. 20 is a flowchart illustrating the flow of processing according to this embodiment. In this image processing, new steps are respectively added after S307, S309 and S310. Specifically, after setting the block size of the local region images in accordance with edge strength (S307, S309, S310), the parameters for affine transformation are respectively set in accordance with edge strength.

Consequently, as shown in FIG. 21(a), if the edge strength of the image of the current pixel periphery is no more than TH1, the local region images are acquired with the initial block size NS and these acquired local region images are directly added. In the case where TH1<edge strength≦TH2, the local region images are acquired with block size N1 and affine transformation images similar to these acquired local region images are detected from a comparatively wide search region (FIG. 21(b)). Also, in the case where TH2<edge strength≦TH3, the local region images are acquired with block size N2 and affine transformation images similar to these acquired local region images are detected from an intermediate size search region (FIG. 21(c)). Likewise, in the case where TH3<edge strength, the local region images are acquired with block size N3 and affine transformation images similar to these acquired local region images are detected from a comparatively small search region (FIG. 21(d)). As shown in FIG. 21, as the edge strength becomes greater, the block size of the local region images that are acquired and the search region for the affine transformation images become smaller.

With this embodiment, since not only the block size of the local region images but also the search region for the affine transformation images are variably set in accordance with edge strength, the calculation processing time can be shortened.

10. Tenth Embodiment

A tenth embodiment of the present invention is described with reference to FIG. 22. A characteristic feature of this embodiment is that the block size of the local region images and the affine transformation parameters can be set for each color component in accordance with the characteristics etc of the original image.

First of all, when performing image improvement using the image processing device, the user can select exclusively (S351) either color bleeding prevention mode or sharp mode.

If color bleeding prevention mode is selected, the R plane and B plane are set as the color planes that are to be the subject of fractal interpolation (S352). In contrast, if sharp mode is selected, the G plane is set as the color plane that is to be the subject of the fractal interpolation (S353).

Then, after setting the initial values of the current pixel in the same way as described above (S354), the edge strength of the pixels at the current pixel periphery is calculated (S355, S356). If the calculated edge strength exceeds the prescribed reference value TH1 (S356: YES), the fractal interpolation is performed (S357, S358) with the block size of the local region image and the affine transformation parameters set in accordance with the edge strength. If the edge strength is not more than the reference value TH1 (S356: NO), the acquired local region images are directly added (S359, S360). The foregoing processing is repeated for pixels of the original image block until processing is completed (S361, S362).

When affine transformation images or local region images have been acquired for all pixels of the original image (S362: YES), all the images are added to perform averaging (S363). Processing of a single plane is thereby completed. It is then ascertained whether or not there is a plane to be processed next (S364); if a plane to be processed is still left, processing changes over to this plane and the processing described above is performed (S365). If processing of all the planes in respect of which performance of the fractal interpolation was specified has been completed, these are combined with the other planes to obtain the output image (S366).

It should be noted that a person skilled in the art could make various additions, alterations or combinations etc within the scope of the gist of the present invention according to the embodiments described above. For example, in the embodiments ascribed above, the case was illustrated by way of example in which local region images were acquired for each pixel of the original image, but there is no restriction to this and for example pixels could be selected at prescribed intervals, such as for example every other pixel or every second pixel, in a range in which adjacent local region images overlap by prescribed amounts.

As described above, with an image processing device and image processing method according to the present invention, a low-quality image can be converted into a high-quality image.

What is claimed is:

1. An image processing device comprising:

original image inputting means for inputting an original image;

image block acquisition means that acquires original image blocks of prescribed size from said original image, adjacent ones of said original image blocks being arranged to overlap with each other;

similar image detection means that detects, from said original image, similar image blocks that are each similar to each of said original image blocks;

image substitution means that substitutes each of said similar image blocks for each of said original image blocks; and image adjustment means that adjusts the overlapping portions of said similar image blocks substituted for said original image blocks.

2. The image processing device according to claim 1, wherein said image adjustment means adds and averages the overlapping portions of said similar image blocks.

3. The image processing device according to claim 1, wherein said image block acquisition means acquires, for each pixel of said original image, an original image block of prescribed size approximately centered on said each pixel.

4. The image processing device according to claim 1, wherein said similar image detection means detects said similar image blocks of a size greater than the size of said original image blocks and then reduces the size of said similar image blocks so as to be equal to the size of said original image blocks.

5. The image processing device according to claim 1, wherein said similar image detection means detects said similar image blocks of the same size as said original image blocks by acquiring scattered pixels from prescribed regions which are set in said original image with a size larger than the size of said original image blocks.

6. The image processing device according to claim 1 wherein said similar image detection means detects said similar image blocks under a prescribed condition that is set beforehand.

7. The image processing device according to claim 6, wherein said prescribed condition includes a condition for setting a search region in which each of said similar image blocks is searched and
said similar image detection means detects each of said similar image blocks within a search region that is set smaller than said original image.

8. The image processing device according to claim 6, wherein said prescribed condition includes a condition for setting a search region in which each of said similar image blocks is searched and a image manipulation parameter for detecting said similar image blocks; and
said similar image detection means acquires a plurality of candidate similar image blocks, while varying the parameters condition of image manipulation, from said search region which is set with respect to each of said original image blocks, and then select, as said similar image block, one of said candidate image blocks that is most similar to said each of said original image blocks.

9. The image processing device according to claim 8, wherein said similar image detection means determines the best image manipulation parameter by evaluating the similarity of said candidate image blocks while varying the image manipulation parameter of said image manipulation, and detects each of said similar image blocks using said best image manipulation parameter.

10. The image processing device according to claims 6, wherein if said original image is a color image, said prescribed condition is set individually for each color component of the colorimetric system.

11. An image processing method comprising the steps of:
acquiring original image blocks from an original image, adjacent ones of said original image blocks being arranged to overlap with each other;
detecting, from said original image, similar image blocks that are each similar to each of said original image blocks;
substituting each of said similar image blocks for each of said original image blocks; and
adjusting overlapping portions of said similar image blocks substituted for said original image blocks.

12. An image processing method comprising the steps of:
acquiring original image blocks from an original image, adjacent ones of said original image blocks being arranged to overlap with each other;
setting a search region with respect to each of said original image blocks;
acquiring a plurality of candidate similar image blocks from said search region with respect to each of said original image blocks;
selecting, from said candidate similar image blocks, a similar image block that is most similar to said each of said original image blocks;
substituting said similar image block for each of said original image blocks; and
adjusting overlapping portions of similar image blocks substituted for said original image blocks.

13. a computer program carried on a computer readable medium comprising:
a program segment for acquiring original image blocks from an original image, adjacent ones of said original image blocks being arranged to overlap with each other;
a program segment for detecting, from said original image, similar image blocks that are each similar to each of said original image blocks;
a program segment for substituting each of said similar image blocks for each of said original image blocks; and
a program segment for adjusting overlapping portions of said similar image blocks substituted for said original image blocks.

14. An image processing device comprising:
original image inputting means for inputting an original image;
image block acquisition means that acquires original image blocks of prescribed size from said original image, adjacent ones of said original image blocks being arranged to overlap with each other;
fractal character evaluation means that evaluates the degree of the fractal character of each of said original image blocks;
similar image detection means that detects, from said original image, similar image blocks that are each similar to each of fractal original image blocks that are evaluated by said fractal character evaluating means as substantially having the significant degree of the fractal character;
image substitution means that substitutes each of said similar image blocks for each of said fractal original image blocks;
image addition means that integrates said similar image blocks substituted for said fractal original image blocks and non-fractal original image blocks that are evaluated by said fractal character evaluating means as not substantially having the significant degree of the fractal character, arranging adjacent ones of said similar image blocks and said non-fractal original image blocks to overlap with each other; and
image adjustment means that adjusts the overlapping portions of said similar image blocks and said non-fractal original image blocks integrated by said image addition means.

15. The image processing device according to claim 14, wherein said fractal character evaluation means calculates the edge strength of each of said original image blocks, and uses said edge strength to evaluate the fractal character of each of said original image blocks.

16. An image processing method comprising the steps of:
acquiring original image blocks of prescribed size from an original image, adjacent ones of said original image blocks being arranged to overlap with each other;
evaluating the degree of the fractal character of each of said original image blocks;
detecting, from said original image, similar image blocks that are each similar to each of fractal original image blocks that are evaluated as substantially having the significant degree of the fractal character;
substituting each of said similar image blocks for each of said fractal original image blocks;
integrating said similar image blocks substituted for said fractal original image blocks and non-fractal original image blocks that are evaluated as not substantially having the significant degree of the fractal character, arranging adjacent ones of said similar image blocks and said non-fractal original image blocks to overlap with each other; and
adjusting the overlapping portions of said similar image blocks and said non-fractal original image blocks integrated by said step of integrating.

17. A computer program carried on a computer readable medium comprising:
a program segment for acquiring original image blocks of prescribed size from an original image, adjacent ones of said original image blocks being arranged to overlap with each other;
a program segment for evaluating the degree of the fractal character of each of said original image blocks;
a program segment for detecting, from said original image, similar image blocks that are each similar to each of fractal original image blocks that are evaluated as substantially having the significant degree of the fractal character;
a program segment for substituting each of said similar image blocks for each of said fractal original image blocks;
a program segment for integrating said similar image blocks substituted for said fractal original image blocks and non-fractal original image blocks that are evaluated as not substantially having the significant degree of the fractal character, arranging adjacent ones of said similar image blocks and said non-fractal original image blocks to overlap with each other; and
a program segment for adjusting the overlapping portions of said similar image blocks and said non-fractal original image blocks integrated by said step of integrating.

18. An image processing device comprising:
original image inputting means for inputting an original image;
image block acquisition means that acquires original image blocks of prescribed size from said original image, adjacent ones of said original image blocks being arranged to overlap with each other;
fractal character evaluation means that evaluates the degree of the fractal character of each of said original image blocks;
similar image detection means that sets search regions for said original image blocks in accordance with evaluation results of the fractal character of said original image blocks, respectively, and then detects, from said search regions, similar image blocks that are each similar to each of said original image blocks;
image substitution means that substitutes each of said similar image blocks for each of said original image blocks;
image addition means that integrate said similar image blocks substituted for said original image blocks, arranging adjacent ones of said similar image blocks to overlap with each other; and
image adjustment means that adjusts the overlapping portions of said similar image blocks integrated by said image addition means.

19. The image processing device according to claim 18,
wherein said similar image detection means detects said similar image blocks only for fractal original image blocks that are evaluated by said fractal character evaluating means as substantially having the significant degree of the fractal character;
wherein said image substitution means substitutes each of said similar image blocks for each of said fractal original image blocks;
wherein said image addition means integrates said similar image blocks substituted for said fractal original image blocks and non-fractal original image blocks that are evaluated by said fractal character evaluating means as not substantially having the significant degree of the fractal character, arranging adjacent ones of said similar image blocks and said non-fractal original image blocks to overlap with each other; and
wherein said image adjustment means adjusts the overlapping portions of said similar image blocks and said non-fractal original image blocks integrated by said image addition means.

20. The image processing means according to claim 18, wherein the higher the degree of the fractal character is evaluated, the smaller said search region is set.

21. The image processing device according to claim 18, wherein said fractal character evaluation means calculates the edge strength of each of said original image blocks, and uses said edge strength to evaluate the fractal character of each of said original image blocks.

22. An image processing device comprising:
original image inputting means for inputting a color original image comprising plural component original planes of plural color components of a colorimetric system;
selection means that selects at least one component original plane from said plural component original planes;
image block acquisition means that acquires original image blocks of prescribed size from said at least one component original plane selected by said selection means, adjacent ones of said original image blocks being arranged to overlap with each other;
fractal character evaluation means that evaluates the degree of the fractal character of each of said original image blocks;
similar image detection means that sets search regions for said original image blocks in accordance with evaluation results of the fractal character of said original image blocks, respectively, and then detects, from said search regions, similar image blocks that are each similar to each of said original image blocks;
image substitution means that substitutes each of said similar image blocks for each of said original image blocks;
image addition means that integrate said similar image blocks substituted for said original image blocks, arranging adjacent ones of said similar image blocks to overlap with each other;

image adjustment means that adjusts the overlapping portions of said similar image blocks integrated by said image addition means to generate at least one component output plane; and combining means that combines said at least one component output plane and at least one component original plane which is not selected from said plural component original planes by said selection means.

23. An image processing method comprising the steps of;

acquiring original image blocks of prescribed size from said original image, adjacent ones of said original image blocks being arranged to overlap with each other;

evaluating the degree of the fractal character of each of said original image blocks;

setting search regions for said original image blocks in accordance with evaluation results of the fractal character of said original image blocks, respectively;

detecting, from said search regions, similar image blocks that are each similar to each of said original image blocks;

substituting each of said similar image blocks for each of said original image blocks;

integrating said similar image blocks substituted for said original image blocks, arranging adjacent ones of said similar image blocks to overlap with each other; and adjusting the overlapping portions of said similar image blocks integrated by said step of integrating.

24. A computer program carried on a computer readable medium comprising:

a program segment for acquiring original image blocks of prescribed size from said original image, adjacent ones of said original image blocks being arranged to overlap with each other;

a program segment for evaluating the degree of the fractal character of each of said original image blocks;

a program segment for setting search regions for said original image blocks in accordance with evaluation results of the fractal character of said original image blocks, respectively;

a program segment for detecting, from said search regions, similar image blocks that are each similar to each of said original image blocks;

a program segment for substituting each of said similar image blocks for each of said original image blocks;

a program segment for integrating said similar image blocks substituted for said original image blocks, arranging adjacent ones of said similar image blocks to overlap with each other; and a program segment for adjusting the overlapping portions of said similar image blocks integrated by said step of integrating.

25. An image processing device comprising:

original image inputting means for inputting an original image;

fractal character evaluation means that evaluates the degree of the fractal character of an image in the vicinity of each of prescribed pixels in said original image;

block size setting means that sets a block size relating to each of said prescribed pixels in accordance with an evaluation result of the fractal character of said image in the vicinity of each of said prescribed pixels;

image block acquisition means that acquires, from said original image, original image blocks each having the block size set by said block size setting means relating to each of said prescribed pixels, adjacent ones of said original image blocks being arranged to overlap with each other;

similar image detection means that sets search regions of prescribed size for said original image blocks, respectively, and then detects, from said search regions, similar image blocks that are each similar to each of said original image blocks;

image substitution means that substitutes each of said similar image blocks for each of said original image blocks;

image addition means that integrate said similar image blocks substituted for said original image blocks, arranging adjacent ones of said similar image blocks to overlap with each other; and image adjustment means that adjusts the overlapping portions of said similar image blocks integrated by said image addition means.

26. The image processing device according to claim 25, wherein the higher the degree of the fractal character is evaluated, the smaller the block size is set.

27. The image processing device according to claim 25, wherein said similar image detection means detects said similar image blocks only for fractal original image blocks that relates to prescribed pixels images in the vicinity of which are evaluated by said fractal character evaluating means as substantially having the significant degree of the fractal character;

wherein said image substitution means substitutes each of said similar image blocks for each of said fractal original image blocks;

wherein said image addition means integrates said similar image blocks substituted for said fractal original image blocks and non-fractal original image blocks that relates to prescribed pixels images in the vicinity of which are evaluated by said fractal character evaluating means as not substantially having the significant degree of the fractal character, arranging adjacent ones of said similar image blocks and said non-fractal original image blocks to overlap with each other; and wherein said image adjustment means adjusts the overlapping portions of said similar image blocks and said non-fractal original image blocks integrated by said image addition means.

28. The image processing device according to claim 25, wherein the higher the degree of the fractal character is evaluated, the smaller said search region is set.

29. The image processing device according to claim 25, wherein said fractal character evaluation means calculates the edge strength of said image, and uses said edge strength to evaluate the fractal character of said image.

30. An image processing device comprising:

original image inputting means for inputting a color original image comprising plural component original planes of plural color components of a colorimetric system;

selection means that selects at least one component original plane from said plural component original planes;

fractal character evaluation means that evaluates the degree of the fractal character of an image in the vicinity of each of prescribed pixels in said at least one component original plane selected by said selection means;

block size setting means that sets a block size relating to each of said prescribed pixels in accordance with an evaluation result of the fractal character of said image in the vicinity of each of said prescribed pixels;

image block acquisition means that acquires, from said at least one component original plane, original image blocks each having the block size set by said block size setting means relating to each of said prescribed pixels, adjacent ones of said original image blocks being arranged to overlap with each other;

similar image detection means that sets search regions of prescribed size for said original image blocks, respectively, and then detects, from said search regions, similar image blocks that are each similar to each of said original image blocks;

image substitution means that substitutes each of said similar image blocks for each of said original image blocks;

image addition means that integrate said similar image blocks substituted for said original image blocks, arranging adjacent ones of said similar image blocks to overlap with each other;

image adjustment means that adjusts the overlapping portions of said similar image blocks integrated by said image addition means to generate one component output plane; and combining means that combines said at least one component output plane and at least one component original plane which is not selected from said plural component original planes by said selection means.

31. An image processing method comprising the steps of:

setting a block size relating to each of prescribed pixels in an original image, in accordance with the degree of the fractal character of an image in the vicinity of each of said prescribed pixels;

acquiring, from said original image, original image blocks each having the block size set by said step of setting relating to each of said prescribed pixels, adjacent ones of said original image blocks being arranged to overlap with each other;

detecting, from said original image, similar image blocks that are each similar to each of said original image blocks;

substituting each of said similar image blocks for each of said original image blocks;

integrating said similar image blocks substituted for said original image blocks, arranging adjacent ones of said similar image blocks to overlap with each other; and adjusting the overlapping portions of said similar image blocks integrated by said step of integrating.

32. A computer program carried on a computer readable medium comprising:

a program segment for setting a block size relating to each of prescribed pixels in an original image, in accordance with the degree of the fractal character of an image in the vicinity of each of said prescribed pixels;

a program segment for acquiring, from said original image, original image blocks each having the block size set by said step of setting relating to each of said prescribed pixels, adjacent ones of said original image blocks being arranged to overlap with each other;

a program segment for detecting, from said original image, similar image blocks that are each similar to each of said original image blocks;

a program segment for substituting each of said similar image blocks for each of said original image blocks;

a program segment for integrating said similar image blocks substituted for said original image blocks, arranging adjacent ones of said similar image blocks to overlap with each other; and a program segment for adjusting the overlapping portions of said similar image blocks integrated by said step of integrating.

* * * * *